United States Patent
Hosseini

(10) Patent No.: US 9,102,011 B2
(45) Date of Patent: Aug. 11, 2015

(54) METHOD AND APPARATUS FOR NON-ABLATIVE, PHOTOACOUSTIC COMPRESSION MACHINING IN TRANSPARENT MATERIALS USING FILAMENTATION BY BURST ULTRAFAST LASER PULSES

(71) Applicant: ROFIN-SINAR TECHNOLOGIES INC., Plymouth, MI (US)

(72) Inventor: S. Abbas Hosseini, Orlando, FL (US)

(73) Assignee: ROFIN-SINAR TECHNOLOGIES INC., Plymouth, MI (US)

( * ) Notice: Subject to any disclaimer, the term of this patent is extended or adjusted under 35 U.S.C. 154(b) by 0 days.

(21) Appl. No.: 13/958,346

(22) Filed: Aug. 2, 2013

(65) Prior Publication Data
US 2015/0034612 A1    Feb. 5, 2015

(51) Int. Cl.
B23K 26/00    (2014.01)
B23K 26/40    (2014.01)
B23K 26/38    (2014.01)
(Continued)

(52) U.S. Cl.
CPC ......... *B23K 26/4025* (2013.01); *B23K 26/0069* (2013.01); *B23K 26/063* (2013.01); *B23K 26/0648* (2013.01); *B23K 26/18* (2013.01); *B23K 26/381* (2013.01)

(58) Field of Classification Search
CPC ............. B23K 26/063; B23K 26/0635; B23K 26/067; B23K 2201/40
USPC ............................ 219/121.6, 121.61, 121.62, 219/121.67–121.69, 121.71, 212.72, 219/121.75, 121.8; 65/386, 392, 111
See application file for complete search history.

(56) References Cited

U.S. PATENT DOCUMENTS 5,107,510 A    4/1992    Seguin et al.
6,084,897 A    7/2000    Wakabayashi et al.
(Continued)

FOREIGN PATENT DOCUMENTS

CA    2332154    9/2009
EP    2781296    9/2014
(Continued)

OTHER PUBLICATIONS

"Burst-train Generation for Femtosecond Laser Filamentation-driven Micromaching" Rezaei, Saeid. Thesis University of Toronto 2011.

(Continued)

*Primary Examiner* — Dana Ross
*Assistant Examiner* — Joseph Iskra
(74) *Attorney, Agent, or Firm* — Woodling, Krost and Rust

(57) ABSTRACT

An apparatus, system and method for the processing of orifices in materials by laser filamentation that utilizes an optical configuration that focuses the incident laser light beam in a distributed manner along the longitudinal beam axis. This distributed focusing method enables the formation of filaments over distances, and the laser and focusing parameters are adjusted to determine the filament propagation and termination points so as to develop a single/double end stopped orifice, or a through orifice. Selected transparent substrates from a stacked or nested configuration may have orifices formed therein/therethrough without affecting the adjacent substrate. These distributed focusing methods support the formation filaments with lengths well beyond ten millimeters in borosilicate glass and similar brittle materials and semiconductors.

24 Claims, 15 Drawing Sheets

(51) Int. Cl.
B23K 26/06 (2014.01)
B23K 26/18 (2006.01)

(56) References Cited

U.S. PATENT DOCUMENTS

| | | | |
|---|---|---|---|
| 6,407,360 | B1 | 6/2002 | Choo et al. |
| 6,552,301 | B2 | 4/2003 | Herman et al. |
| 7,303,977 | B2 | 12/2007 | Voronov et al. |
| 7,626,138 | B2 | 12/2009 | Bovatsek et al. |
| 8,097,830 | B2 | 1/2012 | Woeste et al. |
| 8,624,157 | B2 | 1/2014 | Albelo et al. |
| 8,835,802 | B2 | 9/2014 | Baer |
| 2002/0125232 | A1 | 9/2002 | Choo et al. |
| 2002/0195433 | A1 | 12/2002 | Troitski |
| 2003/0006221 | A1 | 1/2003 | Hong et al. |
| 2004/0017428 | A1* | 1/2004 | Cronin et al. ............... 347/47 |
| 2005/0269301 | A1 | 12/2005 | Burrowes et al. |
| 2006/0207976 | A1 | 9/2006 | Bovatsek et al. |
| 2009/0294422 | A1 | 12/2009 | Lubatschowski et al. |
| 2010/0025387 | A1 | 2/2010 | Arai et al. |
| 2010/0084384 | A1 | 4/2010 | Bovatsek et al. |
| 2011/0259631 | A1* | 10/2011 | Rumsby ................... 174/264 |
| 2013/0126573 | A1 | 5/2013 | Hosseini et al. |

FOREIGN PATENT DOCUMENTS

| | | |
|---|---|---|
| JP | 2006305803 | 11/2006 |
| WO | 2012006736 | 1/2012 |
| WO | 2014134470 | 9/2014 |
| WO | 2014144322 | 9/2014 |
| WO | 2014147048 | 9/2014 |

OTHER PUBLICATIONS

Migliore et al., Advances in Laser Singulation of Silicon, Paper #770, pp. 1-6, Coherent, Inc., Santa Clara, CA, USA; HBL Corporation, Daejeon 305-811 Korea.
Watanabe et al., Filamentation in Ultrafast Laser Material Processing, Book for Springer Series "Progress in Ultrafast Intense Laser Science", pp. 1-6.
Yoshino et al., Micromachining With a High Repetition Rate Femtosecond Fiber Laser, JLMN-Journal of Laser Micro/Nanoengineering, 2008, pp. 157-162, vol. 3, No. 3.
Rezaei, Saeid, Burst-Train Generation for Femtosecond Laser Filamentation-Driven Micromachining, Thesis, Graduatuate Department of Electrical and Computer Engineering, Jan. 2011, pp. 1-118, University of Toronto.
Nguyen et al., Optical Breakdown Versus Filamentation in Fused Silica by Use of Femtosecond Infrared Laser Pulses, Optics Letters, vol. 28, No. 17, Sep. 1, 2003, pp. 1591-1593, Department of Physics, Universite Laval, Quebec, Canada.
Nicholson, David, Laser Pulse Filamentation, Submitted Coursework for PH240, Stanford University, Nov. 27, 2011, pp. 1-4.
Zlotnicki, Steve, What Is Cutting Kerf, May 19, 2013, www.esab-cutting.com, pp. 1-4.
Jha et al., An Integrated PCR Microfluidic Chip Incorporating Aseptic Electrochemical Cell Lysis and Capillary Electrophoresis Amperometric DNA Detection for Rapid and Quantitative Genetic Analysis, The Royal Society of Chemistry, Lab on a Chip, 2012, 12, 4455-4464.
Applied Biosystems Chemistry Guide, DNA Sequencing by Capillary Electrophoresis, Second Edition, 2009, pp. 1-250.
PE Applied Biosystems, Automated DNA Sequencing, Chemistry Guide, 1998, pp. 1-245.
Muller et al, Short-Pulse Lasers Enable Transparent Materials Processing, Industrial Photonics, Oct. 2014, pp. 8-10.
Hosseini, S. Abbas, Method and Apparatus for Hybrid Photoacoustic Compression Machining in Transparent Materials Using Filamentation by Burst Ultrafast Laser Pulses, U.S. Appl. No. 14/520,824, filed Oct. 22, 2014, Applicant: Rofin-Sinar Technologies Inc.
Hosseini, S. Abbas, System for Performing Laser Filamentation Within Transparent Materials, U.S. Appl. No. 14/336,912, filed Jul. 21, 2014, Applicant: Rofin-Sinar Technologies Inc.
Hosseini, S. Abbas, Method and Apparatus for Performing Laser Filamentation Within Transparent Materials, U.S. Appl. No. 14/336,819, filed Jul. 21, 2014, Applicant: Rofin-Sinar Technologies Inc.
Hosseini, S. Abbas, Method of Fabricating a Glass Magnetic Hard Drive Disk Platter Using Filamentation by Burst Ultrafast Laser Pulses, U.S. Appl. No. 14/512,180, filed Oct. 10, 2014, Applicant: Rofin-Sinar Technologies Inc.
Hosseini, S. Abbas, Method and Apparatus for Machining Diamonds and Gemstones Using Filamentation by Burst Ultrafast Laser Pulses, U.S. Appl. No. 14/521,114, filed Oct. 22, 2014, Applicant: Rofin-Sinar Technologies Inc.
Hosseini, S. Abbas, Mass Based Filtration Devices and Method of Fabrication Using Bursts of Ultrafast Laser Pulses, U.S. Appl. No. 14/531,761, filed Nov. 3, 2014, Applicant: Rofin-Sinar Technologies Inc.
Hosseini, S. Abbas, Method of Closed Form Release for Brittle Materials Using Burst Ultrafast Laser Pulses, U.S. Appl. No. 14/538,648, filed Nov. 11, 2014, Applicant: Rofin-Sinar Technologies Inc.
Hosseini, S. Abbas, Method and Apparatus for Forward Deposition of Material Onto a Substrate Using Burst Ultrafast Laser Pulse Energy, U.S. Appl. No. 14/542,647, filed Nov. 16, 2014, Applicant: Rofin-Sinar Technologies Inc.
Hosseini, S. Abbas, Method and Apparatus for Spiral Cutting a Glass Tube Using Filamentation by Burst Ultrafast Laser Pulses, U.S. Appl. No. 14/547,729, filed Nov. 19, 2014, Applicant: Rofin-Sinar Technologies Inc.
Hosseini, S. Abbas, Electro/Mechanical Microchips and Method of Making With Burst Ultrafast Laser Pulses, U.S. Appl. No. 14/539,861, filed Nov. 12, 2014, Applicant: Rofin-Sinar Technologies Inc.
Chin et al., The Propagation of Powerful Femtosecond Laser Pulses in Optical Media: Physics, Applications, and New Challenges, Einstein Centennial Review Article, Can. J. Phys. vol. 83, 2005, pp. 863-905.
Hosseini et al, Measurement of Filament Length Generated by an Intense Femtosecond Laser Pulse Using Electromagnetic Radiation Detection, Applied Physics B, 2003, pp. 583-586, vol. 76, Quebec, Canada.
Hosseini et al., Multi-Parameter Characterization of the Longitudinal Plasma Profile of a Filament: A Comparative Study, Applied Physics B, 2004, pp. 519-523, vol. 79.
Hosseini et al., Competition of Multiple Filaments During the Propagation of Intense Femtosecond Laser Pulses, The American Physical Society, Physical Review A 70, 033802, 2004, pp. 1-12.
European Patent Office, Extended European Search Report, Mar. 18, 2015, p. 1-6, Application No. 14179402.4, Applicant: Rofin-Sinar Technologies, Inc.

* cited by examiner

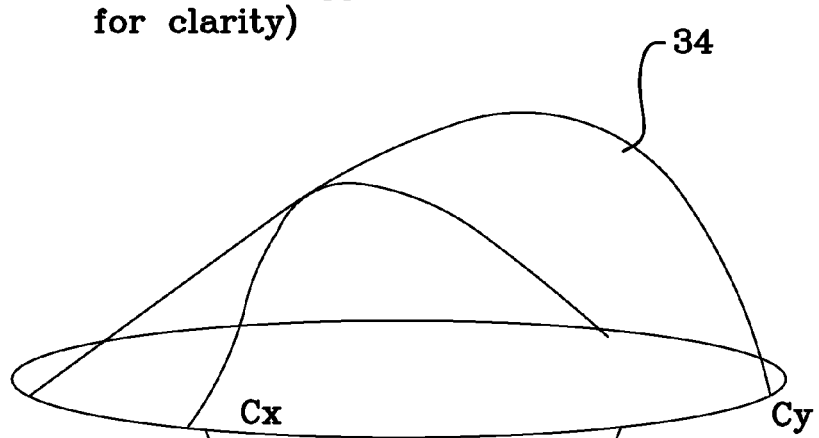
Non Spherical/Spherical Lens
(uncorrected and exaggerated
for clarity)
FIG. 10
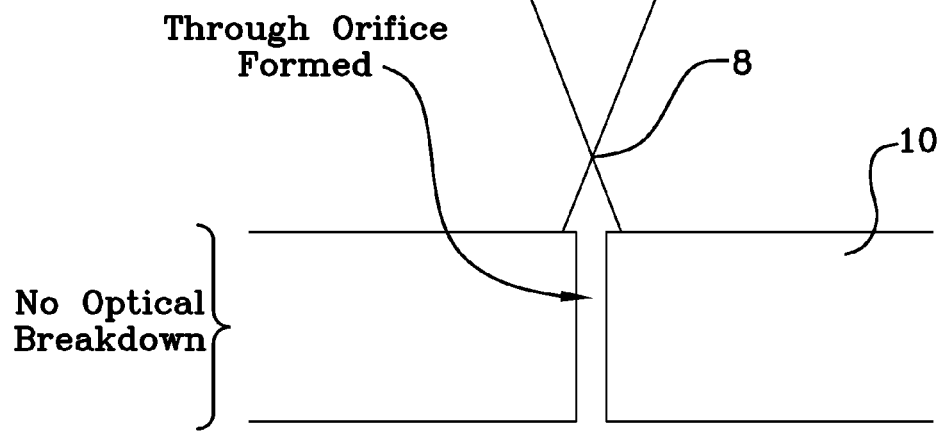

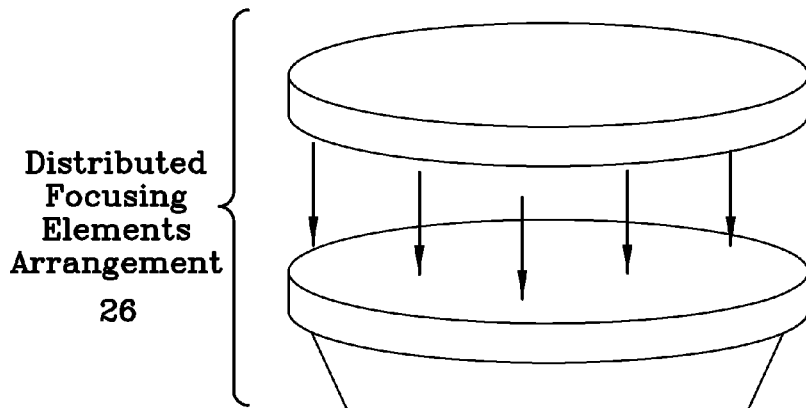
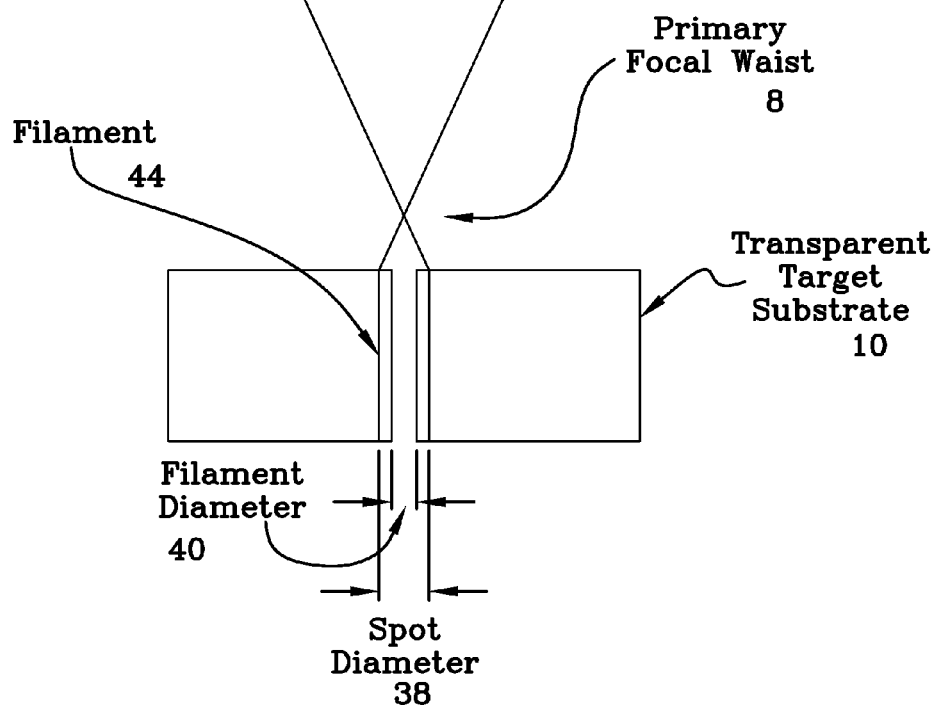
FIG. 11

METHOD AND APPARATUS FOR NON-ABLATIVE, PHOTOACOUSTIC COMPRESSION MACHINING IN TRANSPARENT MATERIALS USING FILAMENTATION BY BURST ULTRAFAST LASER PULSES

BACKGROUND OF THE INVENTION

The present invention relates to a non-ablative method and apparatus for drilling stopped or through orifices beginning at any depth, or in any one of a set of stacked wafers, plates or substrates, primarily, but not limited to, such transparent materials as glass, sapphire, silicon such that the structural characteristics of the orifice and surrounding material exceed that found in the prior art.

There is a huge demand for drilling multiple holes in a transparent substrate such as one made of glass or a polycarbonate. One application of a drilled substrate is for use as a filter for air monitoring, particle monitoring, cytology, chemotaxis, bioassays, and the like. These commonly require orifices a few hundred nanometers to tens of micrometers in diameter that remain identical to each other and have a hole to surface area ratio that remains stable when produced in volume.

Currently, the prior art material processing systems produce orifices in substrates such as glass by diamond drilling, or laser exposure techniques such as: ablative machining; combined laser heating and cooling; and high speed laser scribing. All of the prior art systems have low throughput times, do not work well with many of the new exotic substrate materials, have problems with the opacity of multiple level substrate stacks, cannot attain the close orifice spacing sought, propagate cracks in the material or leave an unacceptable surface roughness on the orifice sides and surface surrounding the point of initiation as detailed below.

In current manufacturing, the singulation, treatment of wafers or glass panels to develop orifices typically relies on diamond cutting routing or drilling.

Laser ablative machining is an active development area for singulation, dicing, scribing, cleaving, cutting, and facet treatment, but has disadvantages, particularly in transparent materials, such as slow processing speed, generation of cracks, contamination by ablation debris, and moderated sized kerf width. Further, thermal transport during the laser interaction can lead to large regions of collateral thermal damage (i.e. heat affected zone). While laser ablation processes can be dramatically improved by selecting lasers with wavelengths that are strongly absorbed by the medium (for example, deep UV excimer lasers or far-infrared CO2 laser), the above disadvantages cannot be eliminated due to the aggressive interactions inherent in this physical ablation process.

Alternatively, laser ablation can also be improved at the surface of transparent media by reducing the duration of the laser pulse. This is especially advantageous for lasers that are transparent inside the processing medium. When focused onto or inside transparent materials, the high laser intensity induces nonlinear absorption effects to provide a dynamic opacity that can be controlled to accurately deposit appropriate laser energy into a small volume of the material as defined by the focal volume. The short duration of the pulse offers several further advantages over longer duration laser pulses such as eliminating plasma plume reflections and reducing collateral damage through the small component of thermal diffusion and other heat transport effects during the much shorter time scale of such laser pulses. Femtosecond and picosecond laser ablation therefore offer significant benefits in machining of both opaque and transparent materials. However, machining of transparent materials with pulses even as short as tens to hundreds of femtosecond is also associated with the formation of rough surfaces and microcracks in the vicinity of laser-formed orifices or trench that is especially problematic for brittle materials like Alumina glasses, doped dielectrics and optical crystals. Further, ablation debris will contaminate the nearby sample and surrounding surfaces.

A kerf-free method of cutting or scribing glass and related materials for orifices relies on a combination of laser heating and cooling, for example, with a CO2 laser and a water jet. Under appropriate conditions of heating and cooling in close proximity, high tensile stresses are generated that induces cracks deep into the material, that can be propagated in flexible curvilinear paths by simply scanning the laser cooling sources across the surface. In this way, thermal-stress induced scribing provides a clean separation of the material without the disadvantages of a mechanical scribe or diamond saw, and with no component of laser ablation to generate debris. However, the method relies on stress-induced crack formation to direct the scribe and a mechanical or laser means to initiate the crack formation. Short duration laser pulses generally offer the benefit of being able to propagate efficiently inside transparent materials, and locally induce modification inside the bulk by nonlinear absorption processes at the focal position of a lens. However, the propagation of ultrafast laser pulses (>5 MW peak power) in transparent optical media is complicated by the strong reshaping of the spatial and temporal profile of the laser pulse through a combined action of linear and nonlinear effects such as group-velocity dispersion (GVD), linear diffraction, self-phase modulation (SPM), self-focusing, multiphoton/tunnel ionization (MPI/TI) of electrons from the valence band to the conduction band, plasma defocusing, and self-steepening. These effects play out to varying degrees that depend on the laser parameters, material nonlinear properties, and the focusing condition into the material.

There are other high speed scribing techniques for flat panel display (FPD) glasses. A 100-kHz Ti:sapphire chirped-pulse-amplified laser of frequency-doubled 780 nm, 300 fs, 100 μJ output was focused into the vicinity of the rear surface of a glass substrate to exceed the glass damage threshold, and generate voids by optical breakdown of the material. The voids reach the back surface due to the high repetition rate of the laser. The connected voids produce internal stresses and damage as well as surface ablation that facilitate dicing by mechanical stress or thermal shock in a direction along the laser scribe line. While this method potentially offers fast scribe speeds of 300 mm/s, there exists a finite kerf width, surface damage, facet roughness, and ablation debris as the internally formed voids reach the surface.

Although laser processing has been successful in overcoming many of the limitations associated with diamond cutting, as mentioned above, new material compositions have rendered the wafers and panels incapable of being laser scribed.

Henceforth, a fast, economical system for drilling through or stopped orifices in transparent materials emanating from the top or bottom surface, that avoids the drawbacks of existing prior art systems would fulfill a long felt need in the materials processing industry. This new invention utilizes and combines known and new technologies in a unique and novel configuration to overcome the aforementioned problems and accomplish this.

SUMMARY OF THE INVENTION

The general purpose of the present invention, which will be described subsequently in greater detail, is to provide an apparatus and method for producing orifices in transparent substrates, generally semiconductor materials such as Si wafers or materials such as glass or Sapphire, by using filamentation by a burst of ultrafast laser pulses with specific adjustments of the laser parameters in conjunction with a distributed focus lens assembly that creates a plurality of different foci wherein the principal focal waist never resides in or on the surface of the target; so as to create a filament in the material that develops an orifice in any or each member of a stacked array of the material wherein the orifice has a specified depth and width at a desired point of initiation and point of termination within the desired wafer, plate or substrate. While the present disclosure focuses primarily on the drilling of orifices it is understood that the system and method described herein are equally applicable to the machining processes of drilling, dicing, cutting and scribing targets.

A method and apparatus for drilling stopped or through orifices beginning at any depth, or in anyone of a set of stacked wafers, plates or substrates, primarily, but not limited to, transparent materials such that the structural characteristics of the orifice and surrounding material exceed that found in the prior art. More particularly, to an apparatus and method of multiple orifice formation in any or each member of a stacked array of materials by a novel method using interference of a burst of ultrafast laser pulses wherein the laser light and focusing parameters have been adjusted to create a filament inside the material that can create an orifice of specified depth and width at the desired point of initiation and point of termination.

A novel and unique technique to create nanometer to micrometer scale orifices in and through transparent material such as Si wafers, glass or Sapphire is disclosed. It has many of the advantages mentioned heretofore and many novel features that result in a new method of producing non-ablatively drilled orifices in materials which is not anticipated, rendered obvious, suggested, or even implied by any of the prior art, either alone or in any combination thereof. Specifically, it offers the following huge advances over the prior art: smoother orifice sides, minimal micro crack propagation, longer/deeper orifice creation, non tapered orifices, nonlinear absorption, orifices with a consistent internal diameter, minimized entrance distortion and reduced collateral damage. The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

BRIEF DESCRIPTION OF THE DRAWINGS

FIG. 10 is a diagrammatic representation of the present invention;

FIG. 11 is a diagrammatic view of the present invention utilizing a distributed focus lens arrangement;

DETAILED DESCRIPTION

Figure 1:
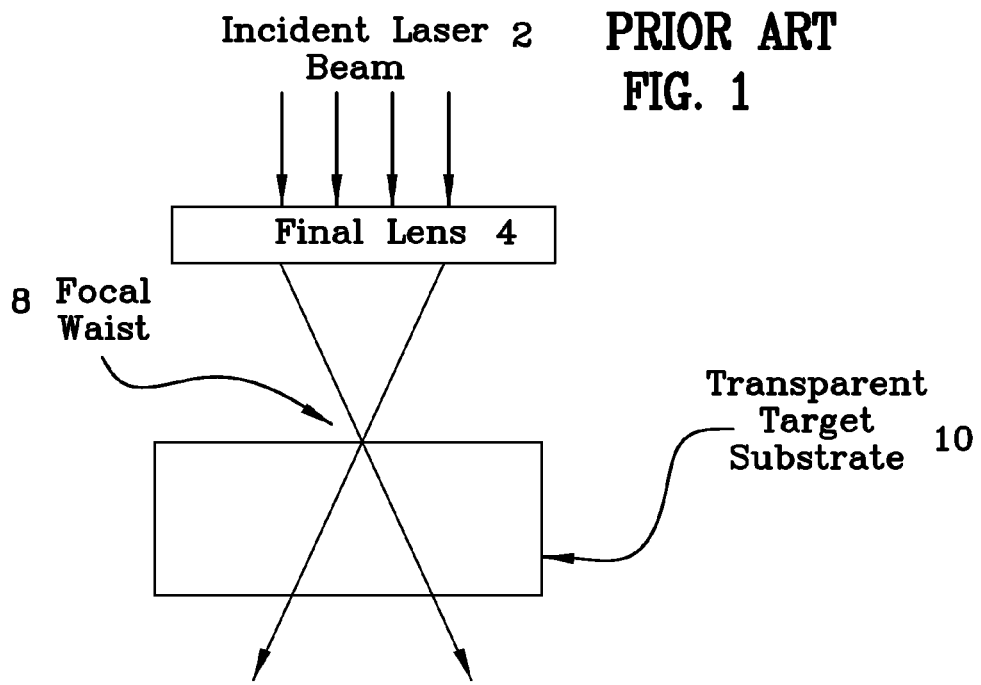
FIG. 1 is a diagrammatic representation of a prior art ablative laser drilling arrangement wherein the principal focus occurs at the top surface of the transparent substrate.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

Unless defined otherwise, all technical and scientific terms used herein are intended to have the same meaning as commonly understood to one of ordinary skill in the art. Unless otherwise indicated, such as through context, as used herein, the following terms are intended to have the following meanings:

As used herein, the term ablative drilling refers to a method of machining a target (generally by cutting or drilling of a substrate by the removal of material) surface by irradiating it with a laser beam. At low laser flux, the material is heated by the absorbed laser energy and evaporates or sublimates. At high laser flux, the material is typically converted to a plasma. Usually, laser ablation refers to removing material with a pulsed laser, but it is possible to ablate material with a continuous wave laser beam if the laser intensity is high enough. Ablative drilling or cutting techniques are characterized by the creation of a debris field, the presence of a liquid/molten phase at some point during the material removal process, and the creation of an ejecta mound at the entrance and or exit of the feature.

As used herein, the term "photoacoustic drilling" refers to a method of machining a target (generally by cutting or drilling of a substrate from a solid by irradiating it with a lower pulse energy light beam than is used in ablative drilling or cutting techniques. Through the processes of optical absorption followed by thermoelastic expansion, broadband acoustic waves are generated within the irradiated material to form a pathway of compressed material about the beam propagation axis (common with the axis of the orifice) therein that is characterized by a smooth wall orifice, a minimized or eliminated ejecta and minimized micro crack formation in the material.

As used herein the term "optical efficiency" relates to the ratio of the fluence at the principal focal waist to the total incident fluence at the clear aperture of the focusing element or assembly.

As used herein, the term "transparent" means a material that is at least partially transparent to an incident optical beam. More preferably, a transparent substrate is characterized by absorption depth that is sufficiently large to support the generation of an internal filament modified array by an incident beam according to embodiments described herein. Stated otherwise, a material having an absorption spectrum and thickness such that at least a portion of the incident beam is transmitted in the linear absorption regime.

As used herein, the term "filament modified zone" refers to a filament region within a substrate characterized by a region of compression defined by the optical beam path.

As used herein, the phrases "burst", "burst mode", or "burst of laser pulses" refer to a collection of laser pulses having a relative temporal spacing that is substantially smaller than the repetition period of the laser. It is to be understood that the temporal spacing between pulses within a burst may be constant or variable and that the amplitude of pulses within a burst may be variable, for example, for the purpose of creating optimized or pre-determined filament modified zones within the target material. In some embodiments, a burst of laser pulses may be formed with variations in the intensities or energies of the pulses making up the burst.

As used herein, the phrase "geometric focus" refers to the normal optical path along which light travels based on the curvature of the lens, with a beam waist located according to the simple lens equation common to optics. It is used to distinguish between the optical focus created by the position of the lenses and their relation to one another and the constriction events created by thermal distortion in the target materials providing, in effect, a quasi-Rayleigh length on the order of up to 15 mm, which is particularly uncommon and related to the inventive nature of this work.

As used herein, the term "substrate" means a glass or a semiconductor and may be selected from the group consisting of transparent ceramics, polymers, transparent conductors, wide bandgap glasses, crystals, crystalline quartz, diamond, sapphire, rare earth formulations, metal oxides for displays and amorphous oxides in polished or unpolished condition with or without coatings, and meant to cover any of the geometric configurations thereof such as but not limited to plates and wafers. The substrate may comprise two or more layers wherein a location of a beam focus of the focused laser beam is selected to generate filament arrays within at least one of the two or more layers. The multilayer substrate may comprise multi-layer flat panel display glass, such as a liquid crystal display (LCD), flat panel display (FPD), and organic light emitting display (OLED). The substrate may also be selected from the group consisting of autoglass, tubing, windows, biochips, optical sensors, planar lightwave circuits, optical fibers, drinking glass ware, art glass, silicon, 111-V semiconductors, microelectronic chips, memory chips, sensor chips, electro-optical lenses, flat displays, handheld computing devices requiring strong cover materials, light emitting diodes (LED), laser diodes (LD), and vertical cavity surface emitting laser (VeSEL). Targets or target materials are generally selected from substrates. As used herein the "principal focal waist" refers to the most tightly focused and strongest focal intensity of the beam after final focusing (after passing through the final optical element assembly prior to light incidence upon the target). It may also be used interchangeably with the term "principal focus." The term "secondary focal waist" refers to any of the other foci in the distributed beam having a lesser intensity than the principal focal waist. It may also be used interchangeably with the term "secondary focus" or "secondary foci."

As used herein the term "filament" refers to any light beam traveling through a medium wherein the Kerr effect can be observed or measured.

As used herein, "laser filamentation" is the act of creating filaments in a material through the use of a laser. As used herein the term "sacrificial layer" refers to a material that can be removeably applied to the target material.

As used herein the term "machining" or "modification" encompasses the processes of drilling orifices, cutting, scribing or dicing a surface or volume of a target or substrate.

As used herein the term "focal distribution" refers to spatiotemporal distribution of incident light rays passing through a lens assembly that in its aggregate is a positive lens. Generally, herein their subsequent convergence of spots of useful intensity as a function from the distance from the center of the focusing lens is discussed.

As used herein the terms "critical energy level," "threshold energy level" and "minimum energy level" all refer to the least amount of energy that must be put into or onto a target to initiate the occurrence of a transient process in the target material such as but not limited to ablative machining, photoacoustic machining, and the Kerr effect.

As used herein the term "aberrative lens" refers to a focusing lens that is not a perfect lens wherein the lens curvature in the X plane does not equal the lens curvature in the Y plane so as to create a distributed focal pattern with incident light that passes through the lens. A positive abberrative lens is a focally converging lens and a negative abberrative lens is a focally diverging lens.

As used herein, the terms, "comprises" and "comprising" are to be construed as being inclusive and open ended, and not exclusive. Specifically, when used in the specification and claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions. In one non-limiting example, the terms "about" and "approximately" mean plus or minus 10 percent or less.

The main objective of the present invention is to provide fast, reliable and economical non-ablative laser machining technique to initiate orifices (stopped/blind or through orifices) in the target material that may be initiated below or above a single of multiple stacked target material by filamentation by a burst(s) of ultrafast laser pulses. Ultra short lasers offer high intensity to micromachine, to modify and to process surfaces cleanly by aggressively driving multi-photon, tunnel ionization, and electron-avalanche processes. The issue at hand is how to put enough energy in the transparent material of the target, less than that used in ablative drilling, but beyond the critical energy level to initiate and maintain photoacoustic compression so as to create a filament that modifies the index of refraction at the focal points in the material and does not encounter optical breakdown (as encountered by the prior art ablative drilling systems) such that continued refocusing of the laser beam in the target material can continue over long distances, enough so that even multiple stacked substrates can be drilled simultaneously with negligible taper over the drilled distance, a relatively smooth orifice wall and can initiate from above, below or within the target material.

Figure 3:
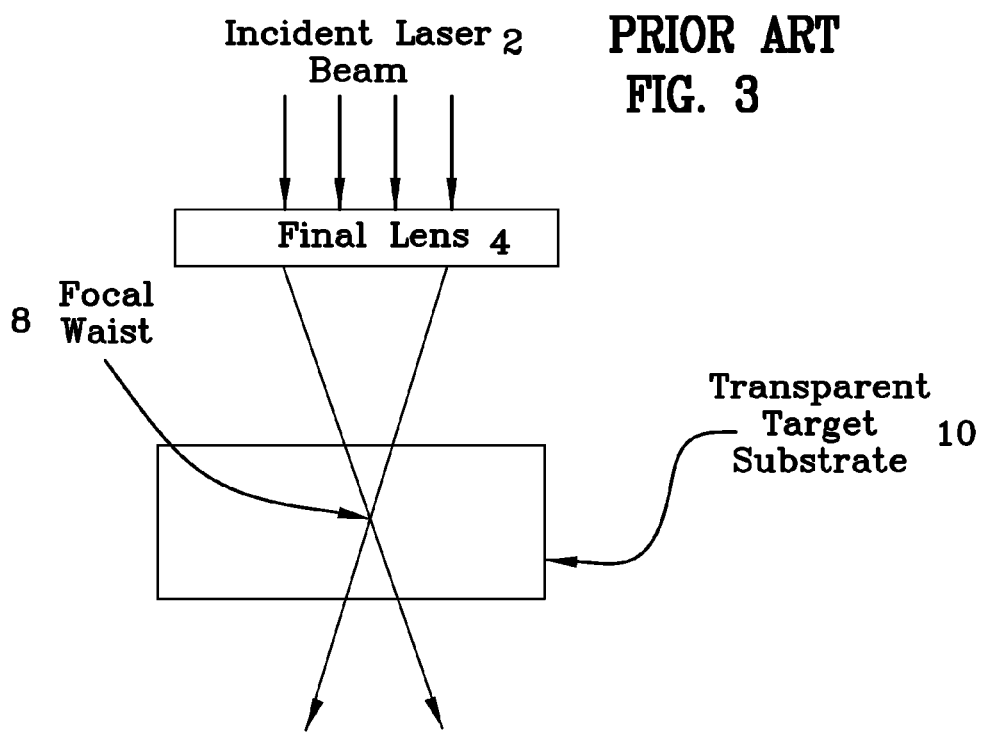
FIG. 3 is a representative side view of a prior art ablative laser drilling arrangement wherein the principal focus occurs below the top surface of the transparent substrate.
Figure 2:
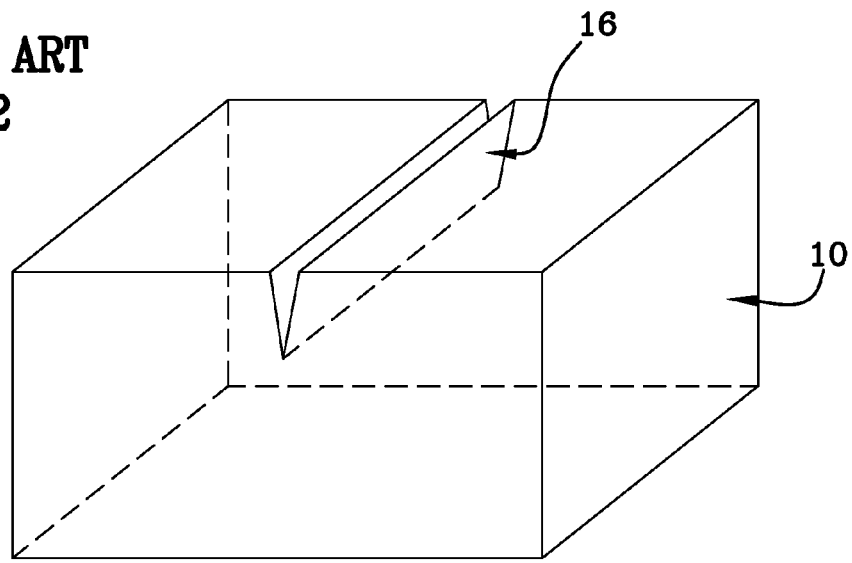
FIG. 2 is a perspective view of a an orifice formed by the drilling arrangement of FIG. 1.
Figure 4:
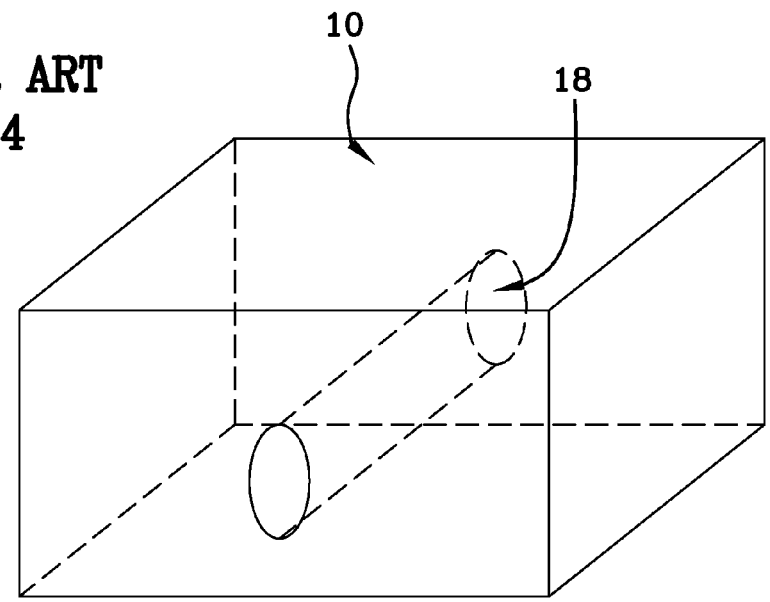
FIG. 4 is a perspective view of a an orifice formed by the drilling arrangement of FIG. 3.
Figure 9:
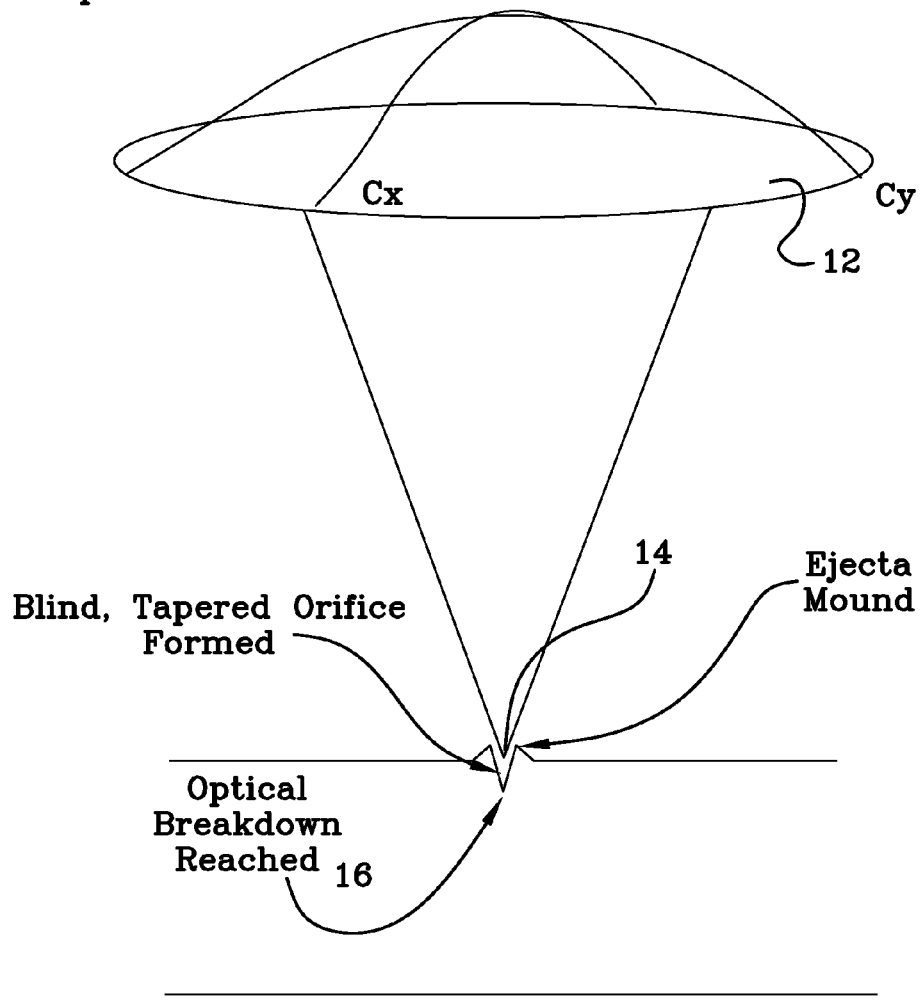
FIG. 9 is a diagrammatic representation of the prior art ablative laser drilling arrangement.

Generally, in the prior art, laser ablation techniques that utilize a high energy pulsed laser beam that is focused to a single principal focus above, within or at a surface of the material, have been used to machine transparent materials. As shown in FIG. 1 the incident laser light beam 2 passes through a focusing assembly passing through a final focusing lens 4 so as to focus a non-distributed light beam 6 that has a focal waist 8 at the surface of the target 10. As can be seen in FIG. 3, optionally, the non-distributed light beam may be focused such that the focal waist resides within the target. Generally these techniques use a perfect spherical focusing lens 12, that is to say a lens that is non-abberrated that has curvature in the X plane that equals the curvature in the Y plane (Cx=Cy) or alternatively with a focusing element assembly that produces a non distributed beam having a single focus 14 as shown in FIG. 9. This creates a tight beam spot that is then delivered on (FIG. 1) or in the target substrate material 10. (FIG. 3) FIG. 2 illustrates the geometry of a machined slot 16 cut with the technique of FIG. 1, and FIG. 4 illustrates the geometry of an oblong orifice 18 made with the technique of FIG. 3.

Propagation of intense ultrafast laser pulses in different optical media has been well studied. Nonlinear refractive index of a material is a function of laser intensity. Having an intense laser pulse with Gaussian profile, wherein the central part of the pulse has much higher intensity than the tails, means the refractive index varies for the central and surrounding areas of the material seeing the laser beam pulse. As a result, during propagation of such laser pulse, the pulse collapses automatically. This nonlinear phenomenon is known in the industry as self-focusing. Self-focusing can be promoted also using a lens in the beam path. In the focal region the laser beam intensity reaches a value that is sufficient to cause multiple-ionization, tunnel ionization and avalanche ionization, which creates plasma in the material. Plasma causes the laser beam to defocus and due to high peak intensity pulse refocus back to form the next plasma volume. The inherent problem with a single focus in a non-distributed beam is that the process ends after the laser pulses lose all their energy and are unable to refocus as discussed below.

Figure 5:
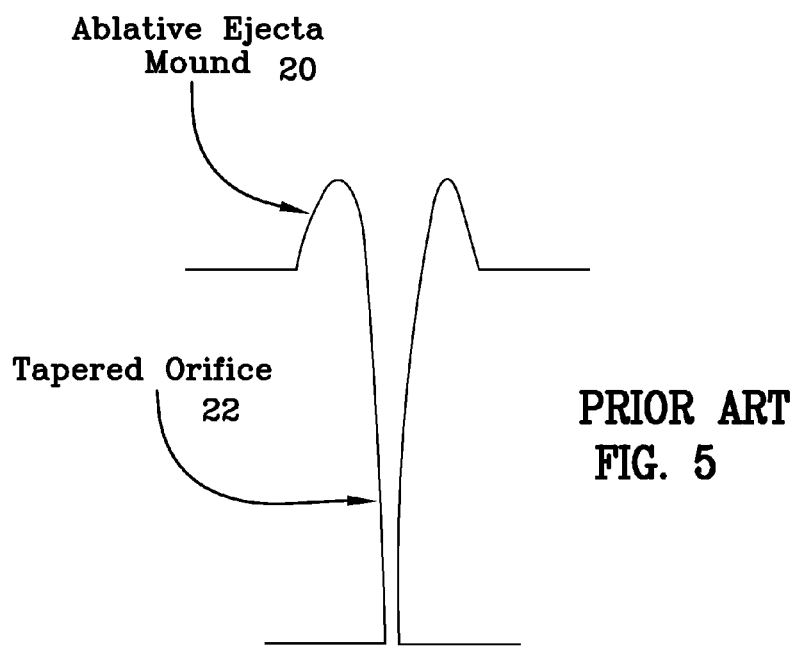
FIG. 5 is a representative side view of an orifice ablatively drilled as the laser arrangement of FIG. 1 wherein the primary focus occurs at the top surface of the transparent substrate.

This ablative method develops a filament in the material 10 of a length of up to 30 microns until it exceeds the optical breakdown threshold for that material and optical breakdown (OB) 16 occurs. (FIG. 9) At OB the maximum threshold fluence (the energy delivered per unit area, in units of J/m2) is reached and the orifice diameter narrows and ablative machining or drilling ceases to proceed any deeper. This is the obvious drawback to using the prior art methods as they limit the size of the orifice that can be drilled, cause a rough orifice wall and result in an orifice with a taper 22 having a different diameter at the top and bottom surfaces of the target 10. (FIG. 5) This occurs because in ablative machining, the beam has central focus 8 (also referred to as a principal focal waist) at the surface of the target 10 causing localized heating and thermal expansion therein heating the surface of the material 10 to its boiling point and generating a keyhole. The keyhole leads to a sudden increase in optical absorptivity quickly deepening the orifice. As the orifice deepens and the material boils, vapor generated erodes the molten walls blowing ejecta 20 out and further enlarging the orifice 22. As this occurs, the ablated material applies a pulse of high pressure to the surface underneath it as it expands. The effect is similar to hitting the surface with a hammer and brittle materials are easily cracked. Additionally, brittle materials are particularly sensitive to thermal fracture which is a feature exploited in thermal stress cracking but not desired in orifice drilling. OB generally is reached when the debris is not ejected, a bubble is created in the orifice 22 or there is a violent ablation that cracks the target in the area of the orifice 22. Anyone or combination of these effects causes the beam 6 to scatter from this point or be fully absorbed not leaving enough beam power (fluence) to drill down through the material 10 any further. Additionally, this creates a distortion or roughness known as the ablative ejecta mound 20 found around the initiating point at the surface of the target substrate 10. (FIG. 5)

Another problem with laser ablation techniques is that the orifices it drills are not of a uniform diameter as the laser beam filamentation changes its diameter as a function of distance. This is described as the Rayleigh range and is the distance along the propagation direction of a beam from the focal waist to the place where the area of the cross section is doubled. This results in a tapered orifice 22 as shown in FIGS. 2 and 5.

The present invention solves the optical breakdown problem, minimizes the orifice roughness and the ablative ejecta mound, and eliminates the tapering diameter 5 orifice.

Figure 6:
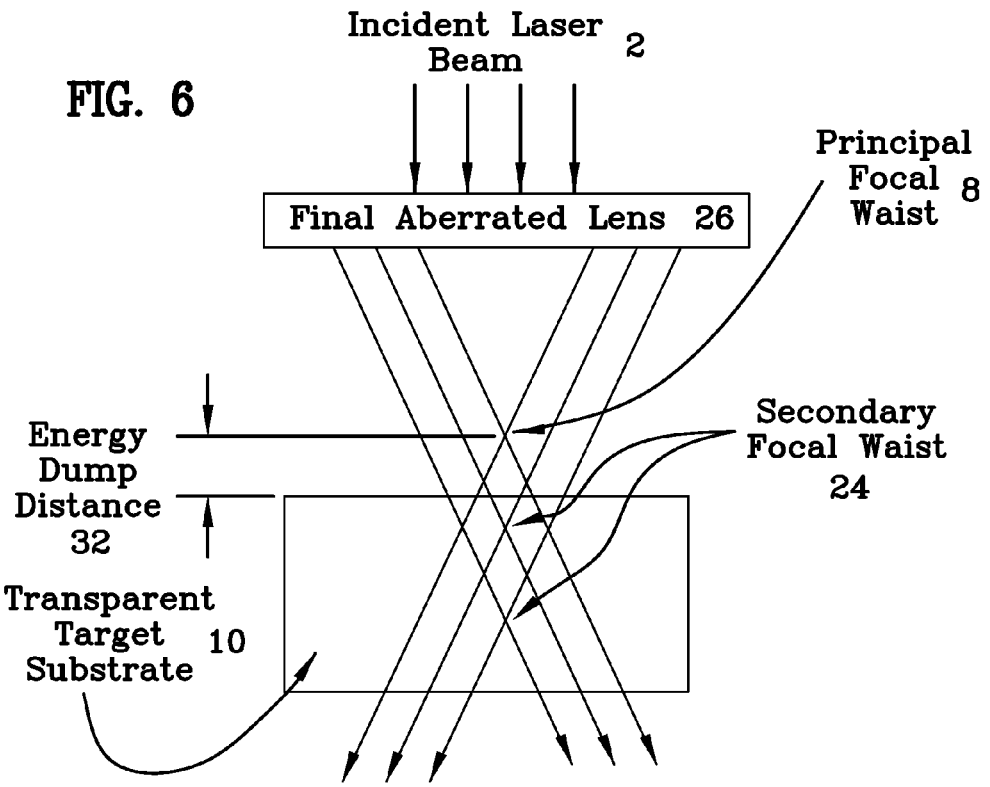
FIG. 6 is a diagrammatic representation of the laser drilling arrangement of the present invention wherein the primary focus occurs above the top surface of the transparent substrate.

The present disclosure provides devices, systems and methods for the processing of orifices in transparent materials by laser induced photoacoustic compression. Unlike previously known methods of laser material machining, embodiments of the present invention utilize an optical configuration that focuses the incident beam 2 in a distributed manner along the longitudinal beam axis such that there is a linear alignment of the principal focus 8 and secondary foci 24 (coincident to the linear axis of the orifice but vertically displaced from the principal focus or focal waist) to allow the continual refocusing of the incident beam 2 as it travels through the material 10 thereby enabling the creation of a filament that modifies the index of refraction along the beam path in the material 10 and does not encounter optical breakdown (as seen in the prior art ablative drilling systems both with and without the use of rudimentary filamentation) such that continued refocusing of the laser beam in the target material can continue over long distances. (FIG. 6)

Figure 7:
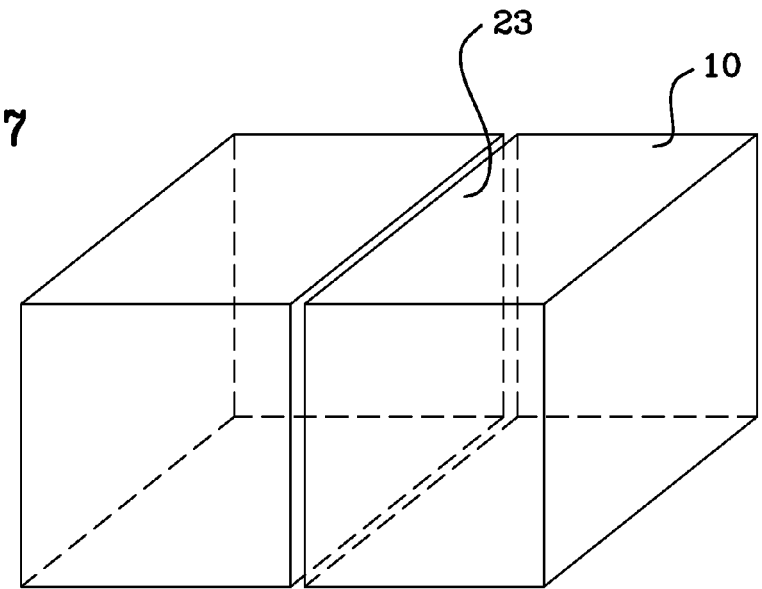
FIG. 7 is a perspective view of an orifice scribe in a transparent substrate formed by the laser drilling arrangement of the present invention.

This distributed focusing method allows for the "dumping" or reduction of unnecessary energy from the incident beam 2 found at the principal focal waist 8 by the creation of secondary foci 24 by the distributed focusing elements assembly 26, and by positioning the location of the principal focal waist 8 from on or in the material, to outside the material 10. This dumping of beam fluence combined with the linear alignment of the principal focal waist 8 and secondary focal waists 24, enables the formation of filaments over distances well beyond those achieved to date using previously known methods (and well beyond 1 mm) while maintaining a sufficient laser intensity (fluence µJ/cm2) to accomplish actual modification and compression over the entire length of the filament zone. This distributed focusing method supports the formation of filaments with lengths well beyond one millimeter and yet maintaining an energy density beneath the optical breakdown threshold of the material with intensity enough so that even multiple stacked substrates can be drilled simultaneously across dissimilar materials (such as air or polymer gaps between layers of target material) with negligible taper over the drilled distance, (FIG. 7) and a relatively smooth walled orifice wall that can be initiated from above, below or within the target material. Propagating a non-tapered wall slit 23 in a target 10 is accomplished by the relative movement of the target 10 while machining an orifice.

The optical density of the laser pulse initiates a self focusing phenomena and generates a filament of sufficient intensity to non-ablative initial photoacoustic compression in a zone within/about/around the filament so as to create a linear symmetrical void of substantially constant diameter coincident with the filament, and also causes successive self focusing and defocusing of said laser pulse that coupled with the energy input by the secondary focal waists of the distributed beam forms a filament that directs/guides the formation of the orifice across or through the specified regions of the target material. The resultant orifice can be formed without removal of material from the target, but rather by a photoacoustic compression of the target material about the periphery of the orifice formed.

Figure 8:
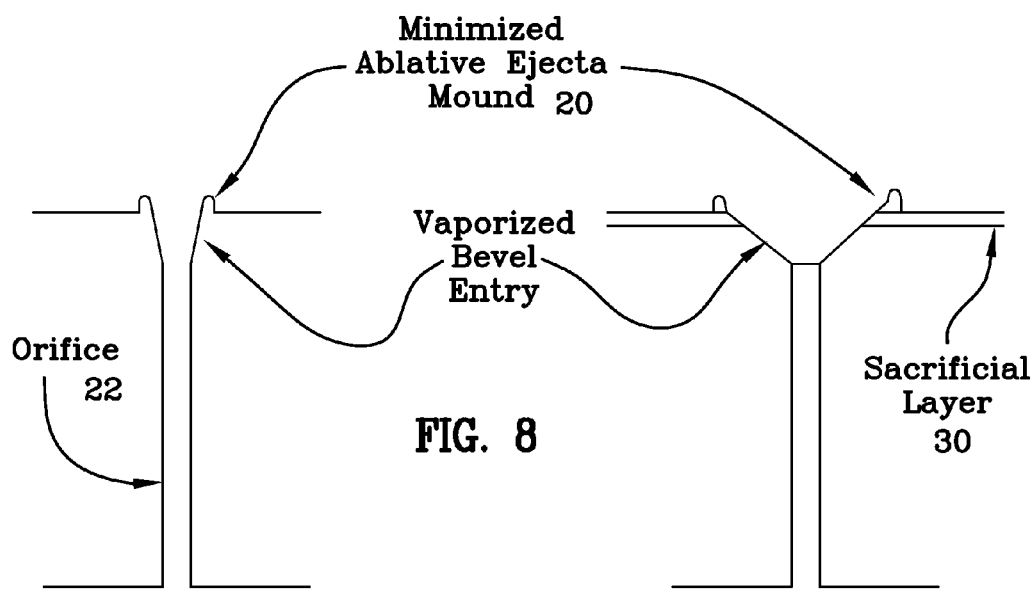
FIG. 8 is a representative side view of two orifices drilled by the laser arrangement of FIG. 6.

It is known that the fluence levels at the surface of the target 10 are a function of the incident beam intensity and the specific distributed focusing elements assembly, and are adjusted for the specific material(s), target(s) thickness, desired speed of machining, total orifice depth and orifice diameter. Additionally, the depth of the orifice drilled is dependent on the depth over which the laser energy is absorbed, and thus the amount of material removed by a single laser pulse, depends on the material's optical properties and the laser wavelength and pulse length. For this reason a wide range of process parameters are listed herein with each particular substrate and matching application requiring empirical determination for the optimal results with the system and materials used. As such, the entry point on the target 10 may undergo some minimal ablative ejecta mound formation 20 if the fluence levels at the surface are high enough to initiate momentary, localized ablative (vaporized) machining, although this plasma creation is not necessary. In certain circumstances it may be desirable to utilize a fluence level at the target surface that is intense enough to create the transient, momentary ablative drilling to give a broad bevelled entry yet have the remainder of the orifice 22 of uniform diameter FIG. 8 as would be created by a distributed focus hybrid drilling method using an energy level that permits a momentary ablative technique followed by a continual photoacoustic compression technique. This can be accomplished by the present invention by selection of a fluence level at the target surface that balances the linear absorption against the non linear absorption of the beam in the material such that the fluence level required for ablative machining will be exhausted at the desired depth of the bevelled (or other geometric configuration). This hybrid technique will result in a minor ejecta mound 20 that can be eliminated if a sacrificial layer 30 is applied to the target surface. Common sacrificial layers are resins or polymers such as but not limited to PVA, Methacrylate or PEG, and generally need only be in the range of 1 to 300 microns thick (although the 10-30 micron range would be utilized for transparent material machining) and are commonly applied by spraying the sacrificial layer onto the target material. The sacrificial layer will inhibit the formation of an ejecta mound on the target 10 by preventing molten debris from attaching itself to the surface, attaching instead to the removable sacrificial material as is well known in the art.

To accomplish photoacoustic compression machining requires the following system:

A burst pulse laser system capable of generating a beam comprising a programmable train of pulses containing from 1 to 50 subpulses within the burst pulse envelope. Further the laser system needs to be able to generate average power from 1 to 200 watts depending on the target material utilized, typically this range would be in the range of 50 to 100 watts for borosilicate glass.

A distributed focusing element assembly (potentially comprising positive and negative lenses but having a positive focusing effect in the aggregate) capable of producing a weakly convergent, multi foci spatial beam profile where the incident fluence at the target material is sufficient to cause Kerr-effect self-focusing and propagation.

An optical delivery system capable of delivering the beam to the target.

Commercial operation would also require translational capability of the material (or beam) relative to the optics (or vice versa) or coordinated/compound motion driven by a system control computer.

The use of this system to drill photoacoustic compression orifices requires the following conditions be manipulated for the specific target(s): the properties of the distributed focus element assembly; the burst pulsed laser beam characteristics; and the location of the principal focus.

The distributed focus element assembly 26 may be of a plethora of generally known focusing elements commonly employed in the art such as aspheric plates, telecentric lenses, non-telecentric lenses, aspheric lenses, axicon, annularly faceted lenses, custom ground aberrated (non-perfect) lenses, a combination of positive and negative lenses or a series of corrective plates (phase shift masking), any optical element tilted with respect to the incident beam, and actively compensated optical elements capable of manipulating beam propagation. The principal focal waist of a candidate optical element assembly as discussed above, generally will not contain more than 90% nor less than 50% of incident beam fluence at the principal focal waist. Although in specific instances the optical efficiency of the distributed focus element assembly 26 may approach 99%. FIG. 10 illustrates a non-aspherical, aberrated lens 34 as would be used in the aforementioned process. The actual optical efficiency of the distributed focus element assembly 26 will have to be fine-tuned for each specific application. The users will create a set of empirical tables tailored for each transparent material, the physical configuration and characteristics of the target as well as the specific laser parameters. Silicon Carbide, Gallium Phosphide, sapphire, strengthened glass etc., each has its own values. This table is experimentally determined by creating a filament within the material (adjusting the parameters of laser power, repetition rate, focus position and lens characteristics as described above) and ensuring that there is sufficient fluence to induce a plane of cleavage or axis of photoacoustic compression to create an orifice. A sample optical efficiency for drilling a 5 micron diameter through orifice (as illustrated in FIG. 11) in a 2 mm thick single, planar target made of borosilicate with a 1 micron wavelength, 50 watt laser outputting a burst pulse of 10 µJ energy having a frequency (repetition rate) that would lie in the 1 MHz range is 65% wherein the principal focal waist of the beam resides is in the range of up to 500 µm off of the desired point of initiation.

Figure 12:
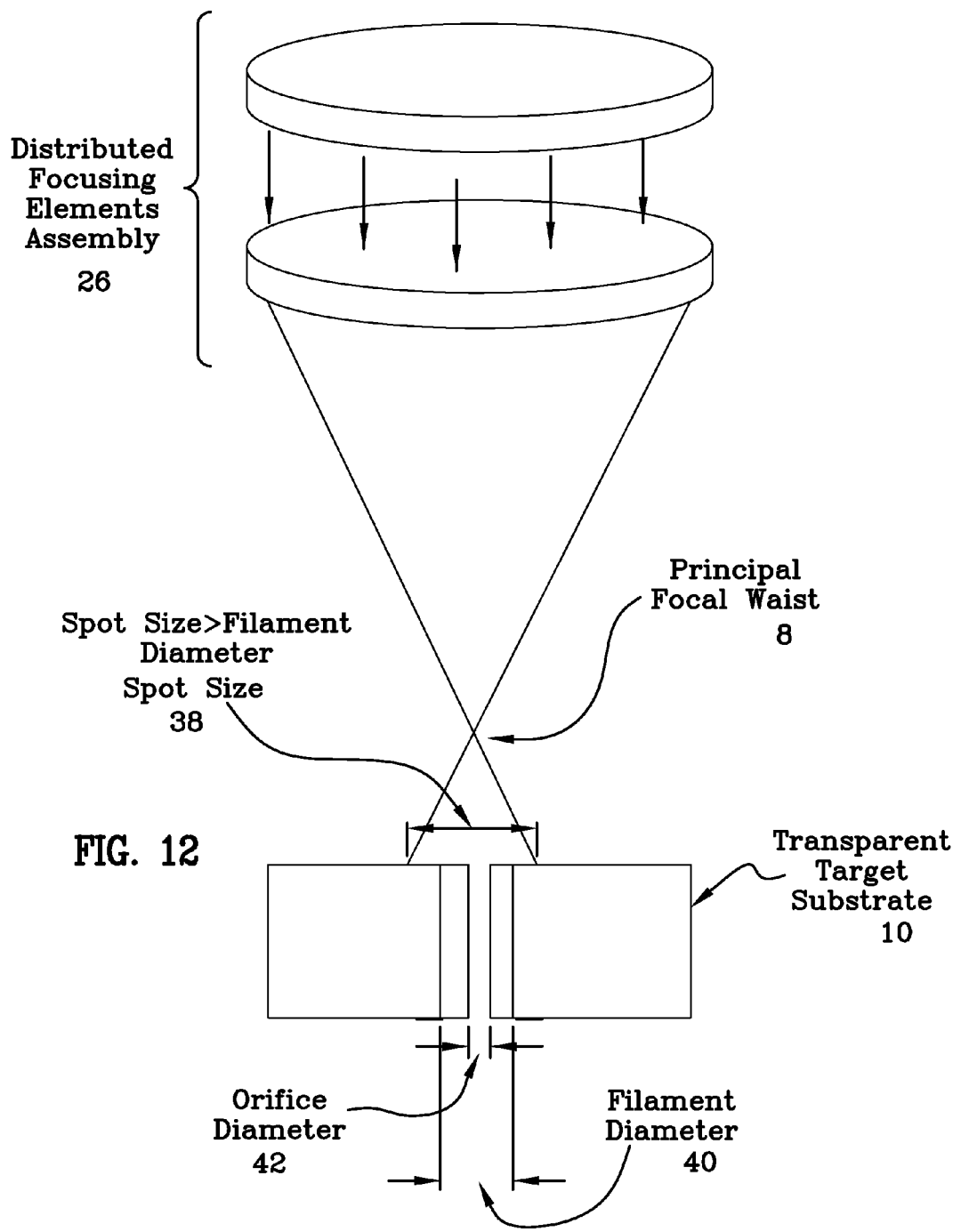
FIG. 12 is a diagrammatic view of the present invention utilizing a distributed focus lens arrangement.

It is to be noted that there is also a set of physical parameters that must be met by this photoacoustic compression drilling process. Looking at FIGS. 11 and 12 it can be seen that the beam spot diameter 38>the filament diameter 40>the orifice diameter 42. Additionally the distributed beam's primary focal waist 8 is never in or on the surface of the target material 10 into which a filament is created.

The location of the principal focal waist 8 is generally in the range of up to 500 µm off of the desired point of initiation. This is known as the energy dump distance 32. It also is determined by the creation an empirical table tailored for each transparent material, the physical configuration and characteristics of the target as well as the laser parameters. It is extrapolated from the table created by the method noted above.

Figure 17:
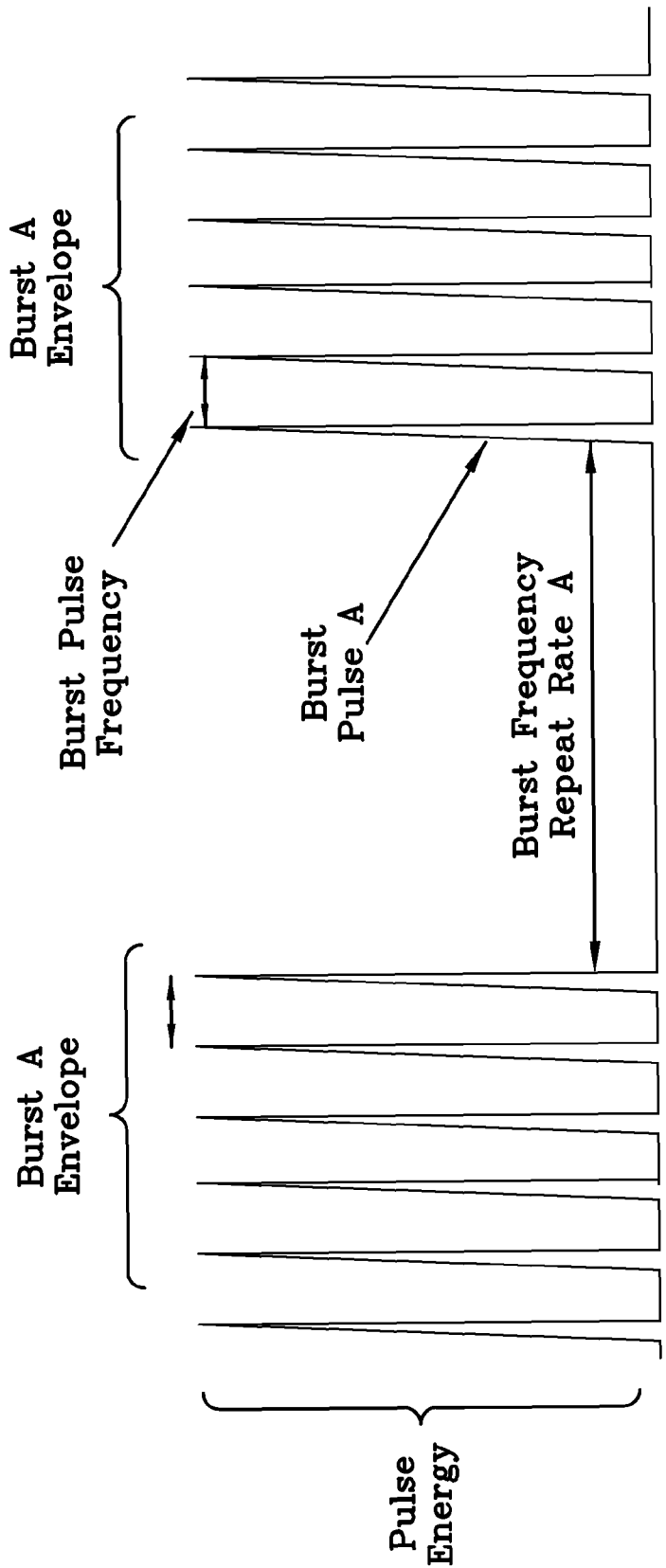
FIGS. 17-19 show three various configurations of the distribution of laser energy.
Figure 18:
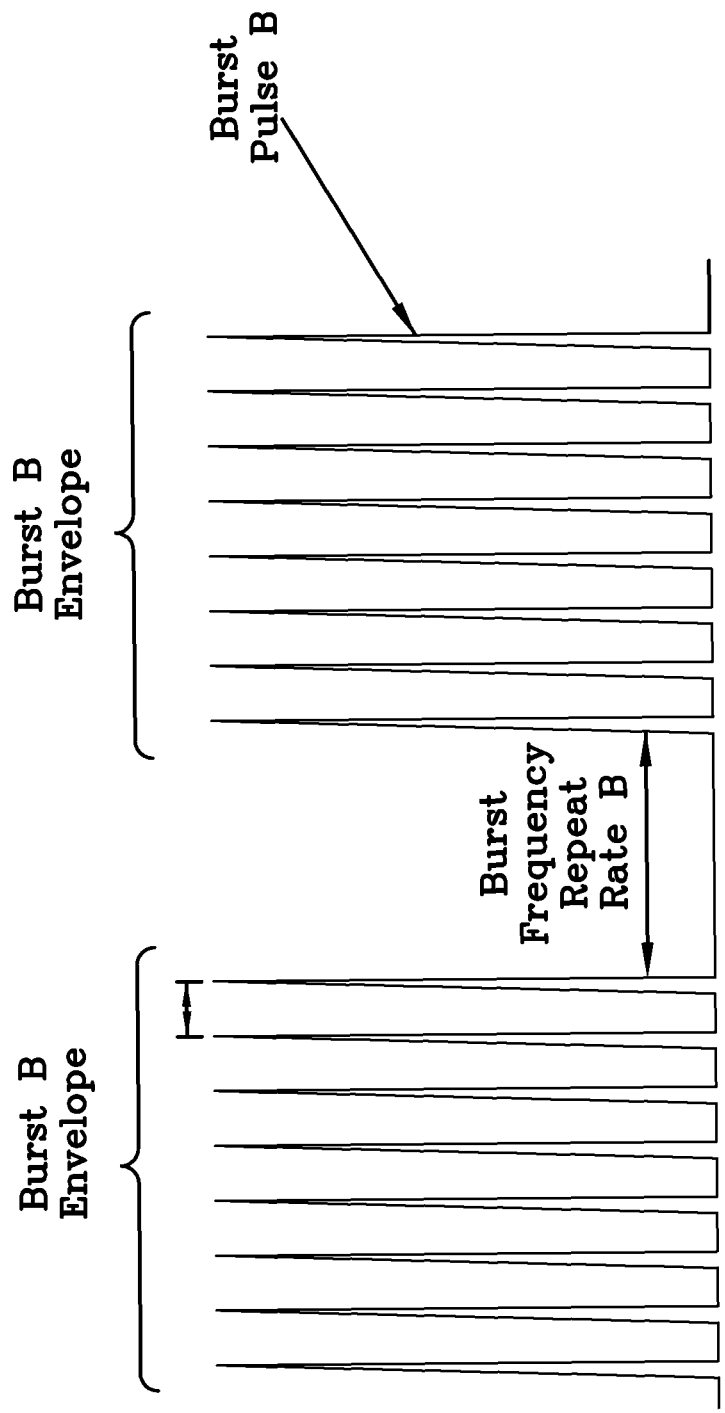
Figure 19:
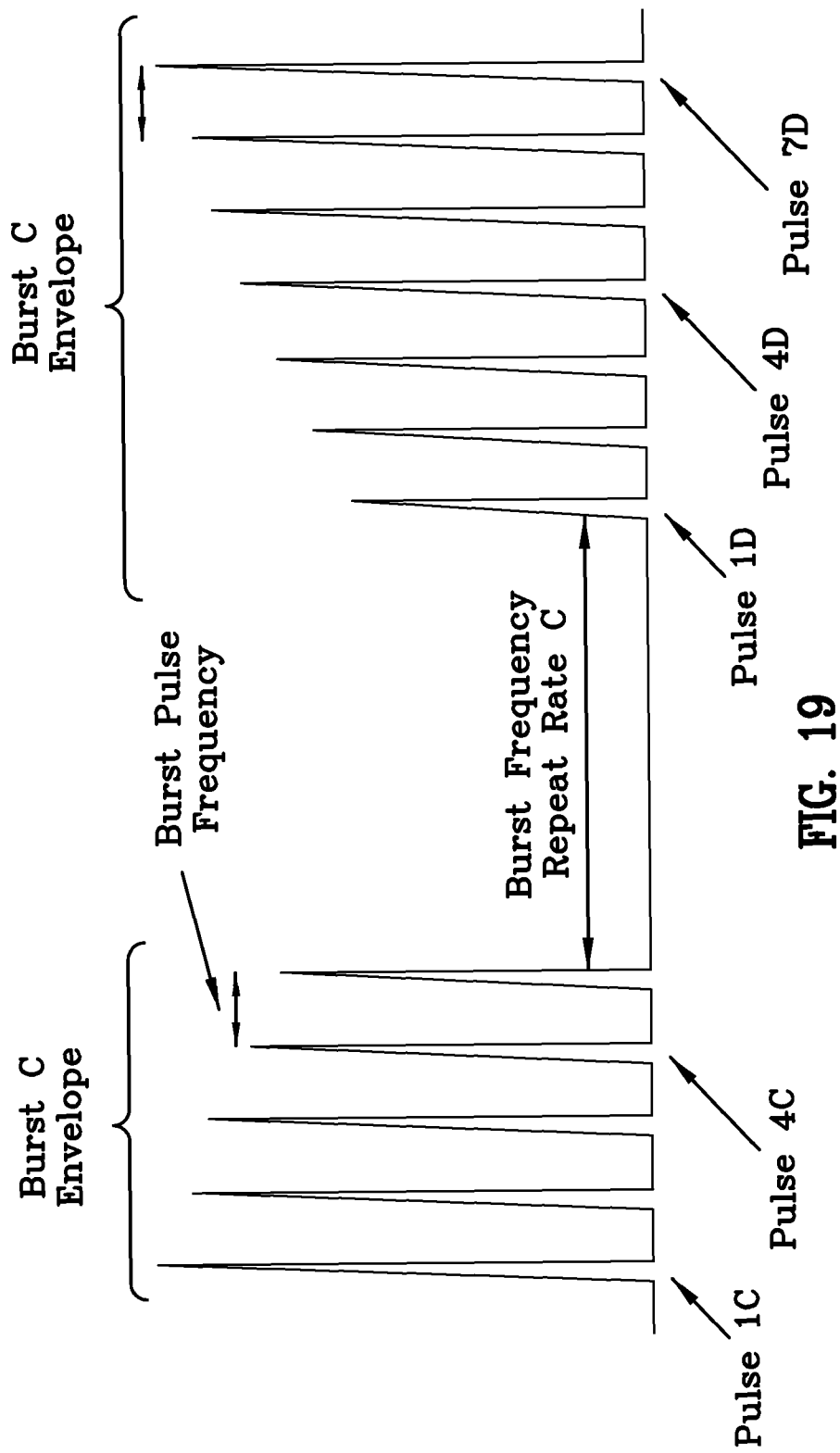

The laser beam energy properties are as follows: a pulse energy in the beam between 0.5 µJ to 100 µJ the repetition rate from 1 Hz to 2 MHz (the repetition rate defines the speed of sample movement and the spacing between neighboring filaments). The diameter and length of the filament may be adjusted by changing the temporal energy distribution present within each burst envelope. FIGS. 17-19 illustrate examples of three different temporal energy distributions of a burst pulsed laser signal. The rising and falling burst envelope profiles of FIG. 19 represent a particularly useful means of process control especially well adapted for removing thin metal layers from dielectric materials.

Looking at FIGS. 13-16 collectively, the mechanism of the present invention can best be illustrated. Herein, burst picosecond pulsed light is used because the total amount of energy deposited in the target material is low and photoacoustic compression can proceed without cracking the material, and less heat is generated in the target material thus efficient smaller packets of energy are deposited in the material so that the material can be raised incrementally from the ground state to a maximally excited state without compromising the integrity of the material in the vicinity of the filament.

The actual physical process occurs as described herein. The principal focal waist of the incident light beam of the pulsed burst laser is delivered via a distributed focusing element assembly to a point in space above or below (but never within) the target material in which the filament is to be created. This will create on the target surface a spot as well as white light generation. The spot diameter on the target surface will exceed the filament diameter and the desired feature (orifice, slot, etc.) diameter. The amount of energy thus incident in the spot on surface being greater than the critical energy for producing the quadratic electro-optic effect (Kerr effect—where the change in the refractive index of the material is proportional to the applied electric field) but is lower than the critical energy required to induce ablative processes and more explicitly below the optical breakdown threshold of the material. Self-focusing occurs above a critical power that satisfies the relationship whereby the power is inversely related to the product of the real and complex indices of refraction for the target material. Photoacoustic compression proceeds as a consequence of maintaining the required power in the target material over time scales such that balancing between the self-focus condition and the optical breakdown condition can be maintained. This photoacoustic compression is the result of a uniform and high power filament formation and propagation process whereby material is rearranged in favor of removal via ablative processes. The extraordinarily long filament thus produced is fomented by the presence of spatially extended secondary foci created by the distributed focusing element assembly, maintaining the self focusing effect without reaching optical breakdown. In this assembly, a large number of marginal and paraxial rays converge at different spatial locations relative to the principal focus. These secondary foci exist and extend into infinite space but are only of useful intensity over a limited range that empirically corresponds to the thickness of the target. By focusing the energy of the second foci at a lower level below the substrate surface but at the active bottom face of the filament event allows the laser energy access to the bulk of the material while avoiding absorption by plasma and scattering by debris.

Figure 13:
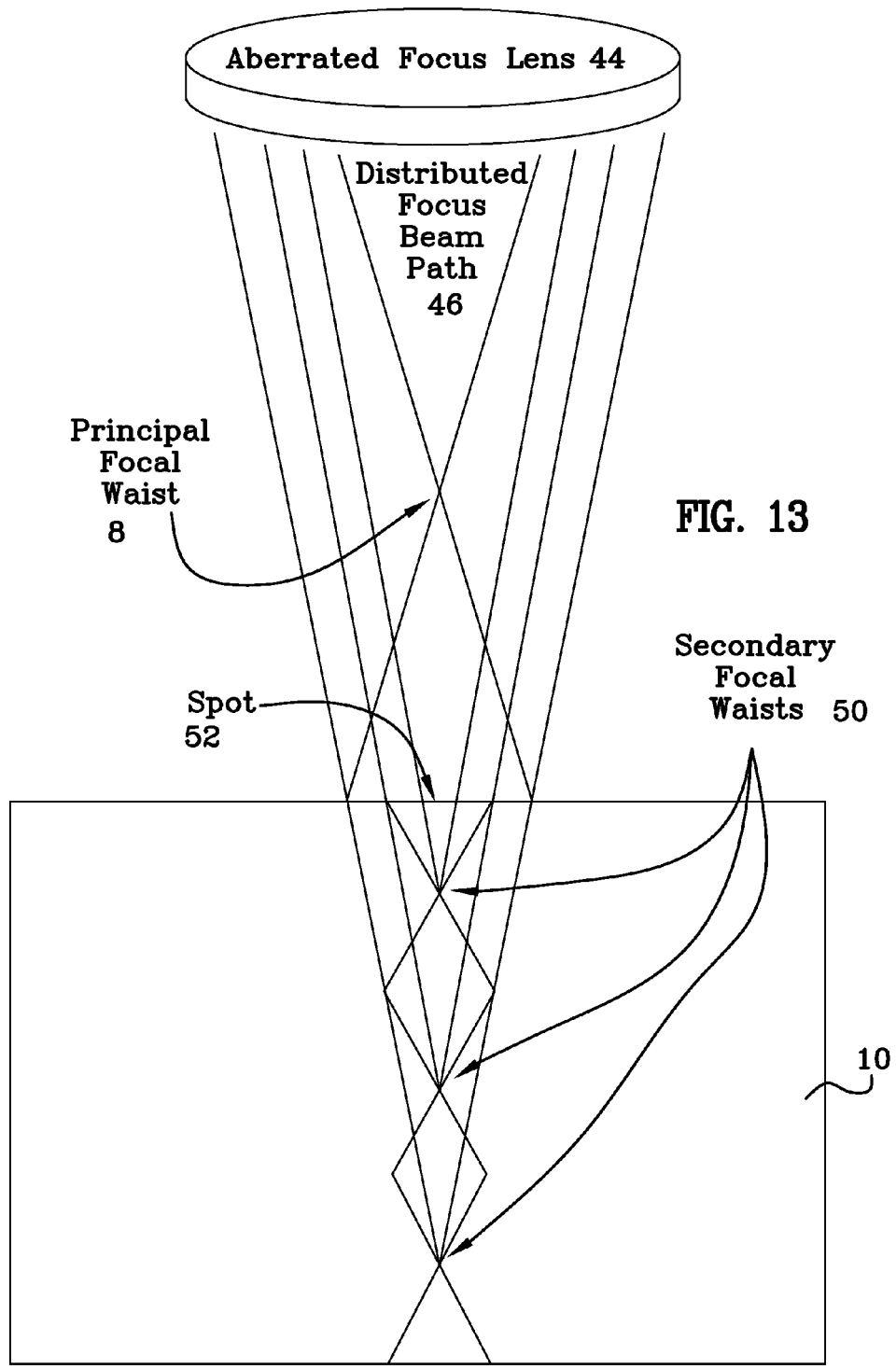
FIG. 13 is a diagrammatic view of the present invention utilizing a distributed focus lens arrangement and the distribution of focal waists where the principal focus is above the target.
Figure 14:
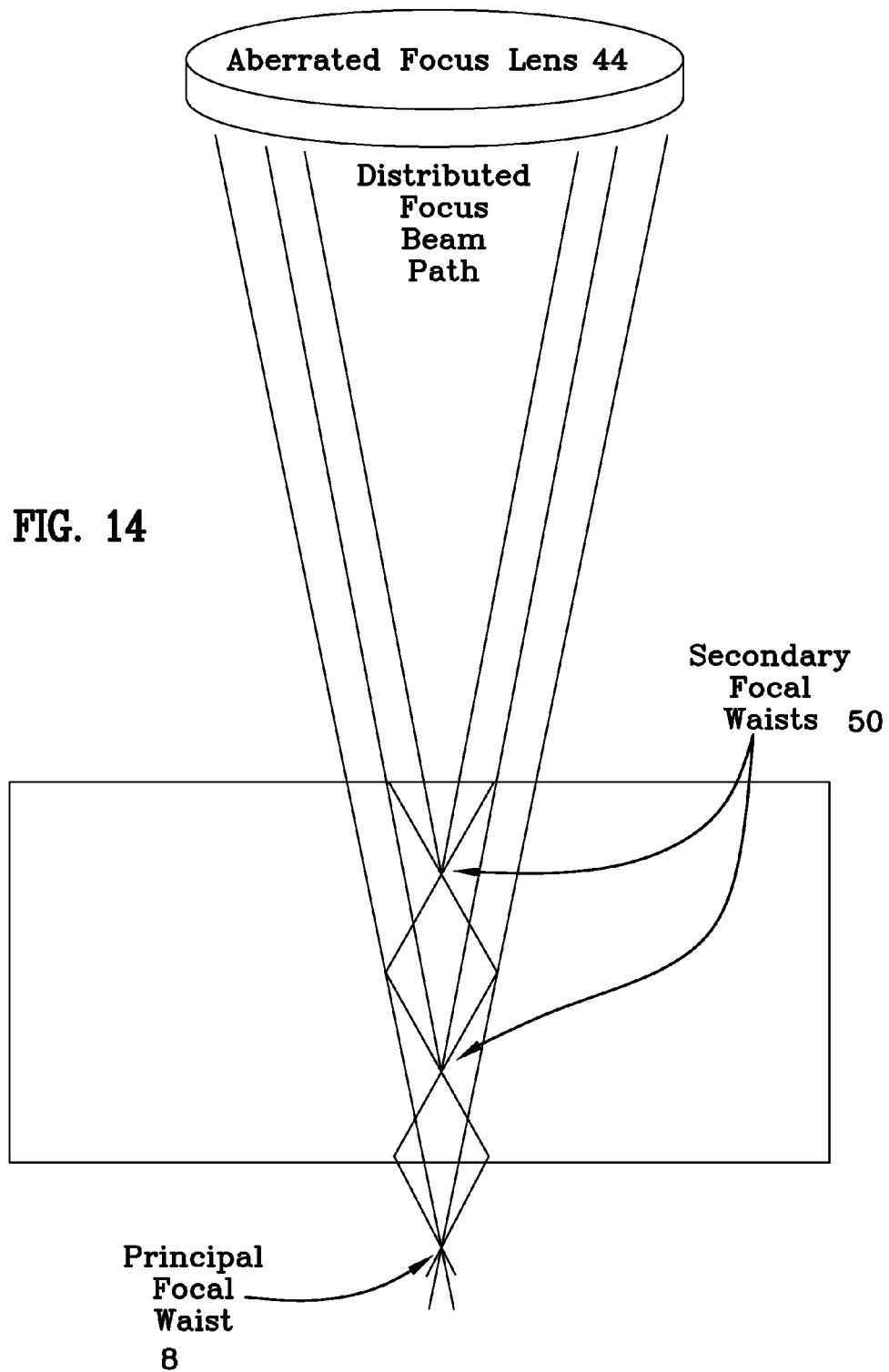
FIG. 14 is a diagrammatic view of the present invention utilizing a distributed focus lens arrangement and the distribution of focal waists where the principal focus is below the target.
Figure 15:
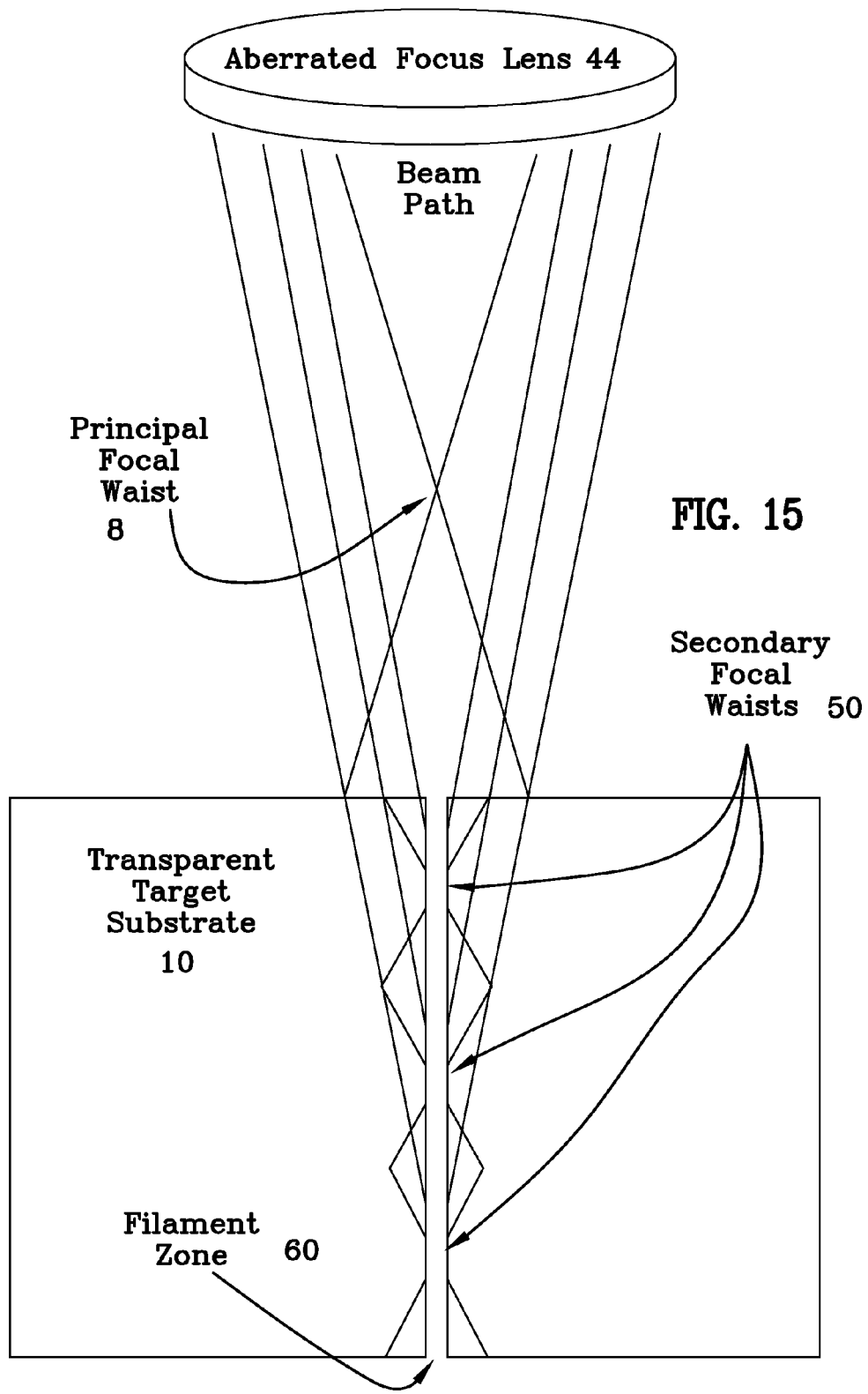
FIG. 15 is a diagrammatic view of the present invention of FIG. 13 wherein the orifice has been drilled.

The distributed focal element assembly can be a single aberrated focal lens placed in the path of the incident laser beam to develop what appears to be an unevenly distributed focus of the incident beam into a distributed focus beam path containing a principal focal waist and a series of linearly arranged secondary focal waists (foci). The alignment of these foci is collinear with the linear axis of the orifice 42. Note that the principal focal waist 8 is never on or in the target material 10. In FIG. 13 the principal focal waist is above the target material and in FIG. 14 it is below the target material 10 as the orifice 42 may be initiated above or below the principal focal waist 8 by virtue of the symmetric and non-linear properties of the focused beam. Thus a beam spot 52 (approximately 10 µm distance) resides on the surface of the target 10 and the weaker secondary focal waists collinearly reside within the target because the material acts as the final optical element creating these focal points as the electric field of the laser alters the indices of refraction of the target. This distributed focus allows the amount of laser energy to be deposited in the material so as to form a filament line or zone 60. With multiple linear aligned foci and by allowing the material to act as the final lens, the target material when bombarded with ultrafast burst pulse laser beams, undergoes numerous, successive, localized heatings which thermally induced changes in the material's local refractive index along the path of the liner aligned foci causing a lengthy untapered filament 60 to be developed in the target followed by an acoustic compression wave that annularly compresses the material in the desired region creating a void and a ring of compressed material about the filamentation path. Then the beam refocuses and the refocused beam combined with the energy at the secondary focal waists maintains the critical energy level and this chain of events repeats itself so as to drill an orifice capable of 1500:1 aspect ratio (length of orifice/diameter of orifice) with little to no taper and an entrance orifice size and exit orifice size that are effectively the same diameter. This is unlike the prior art that focuses the energy on the top surface of or within the target material resulting in a short filamentation distance until the optical breakdown is reached and filamentation degrades or ceases.

Figure 16:
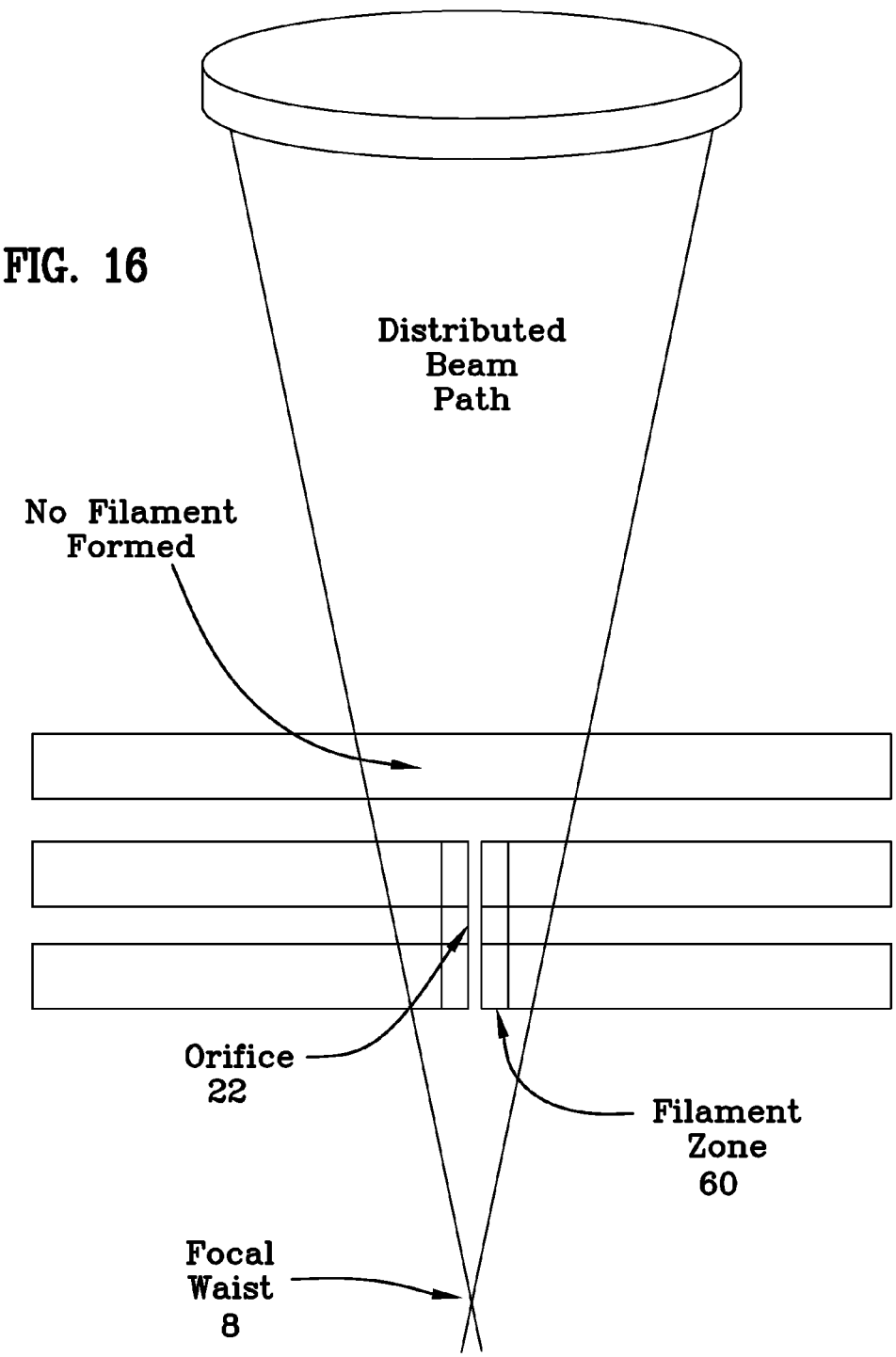
FIG. 16 is a diagrammatic view of the present invention utilizing a distributed focus lens arrangement and the distribution of focal waists where the principal focus is below multiple targets.

FIG. 16 illustrates the drilling of orifices in the bottom two of three planar targets 10 in a stacked configuration with an air gap between them wherein the principal focal waist 8 is positioned below the final target 10. The hole can be drilled from the top or the bottom or the middle of a multiple layer setup, but the drilling event always occurs the same distance from the principal focal waist if the same lens set and curvature is used. The focal waist is always outside of the material and never reaches the substrate surface.

The method of drilling orifices is through photoacoustic compression is accomplished by the following sequence of steps:

1. passing laser energy pulses from a laser source through a selected distributive-focus lens focusing assembly;
2. adjusting the relative distance and or angle of said distributive-focus lens focusing assembly in relation to a laser source so as to focus the laser energy pulses in a distributed focus configuration to create a principal focal waist and at least one secondary focal waist;
3. adjusting the principal focal waist or the target such that the principal focal waist will not reside on or in the target that is being machined;
4. adjusting the focus such that the spot of laser fluence on the surface of the target that is located below or above said principal focal waist, has a diameter that is always larger than a diameter of a filamentation that is formed in the target;
5. adjusting the fluence level of the secondary focal waists are of sufficient intensity and number to ensure propagation of a photoacoustic compressive machining through the desired volume of the target; and
6. applying at least one burst of laser pulses of a suitable wavelength, suitable burst pulse repetition rate and suitable burst pulse energy from the laser source to the target through the selected distributive-focus lens focusing assembly, wherein the total amount of pulse energy or fluence, applied to the target at a spot where the laser pulse contacts the point of initiation of machining on the target, is greater that the critical energy level required to initiate and propagate photoacoustic compression machining, yet is lower than the threshold critical energy level required to initiate ablative machining; and
7. stopping the burst of laser pulses when the desired machining has been completed.

As mentioned earlier, there may be specific orifice configurations wherein a tapered entrance to the orifice may be desired. This is accomplished by initiation of the orifice with a laser fluence level that is capable of ablative machining for a desired distance and completing the drilling with a laser fluence level below the critical level for ablative machining yet above the critical level for photoacoustic machining to the desired depth in that material. This type of orifice formation may also utilize the application of a removable sacrificial layer on the surface of the target. This would allow the formation of the ejecta mound onto the sacrificial layer such that the ejecta mound could be removed along with the sacrificial layer at a later time. Such an orifice drilled by a hybrid ablative and photoacoustic compression method of machining would be performed through the following steps, although the application of the sacrificial layer need be utilized and if utilized need not occur first:

1. applying a sacrificial layer to at least one surface of a target;
2. passing laser energy pulses from a laser source through a selected distributive-focus lens focusing assembly;
3. adjusting the relative distance and or angle of said distributive-focus lens focusing assembly in relation to a laser source so as to focus the laser energy pulses in a distributed focus configuration to create a principal focal waist and at least one secondary focal waist;
4. adjusting the principal focal waist or the target such that the principal focal waist will not reside on or in the target that is being machined;
5. adjusting the focus such that the spot of laser fluence on the surface of the target that is located below or above said principal focal waist;
6. adjusting the spot of laser fluence on the surface of the target such that it has a diameter that is always larger than a diameter of a filamentation that is to be formed in the target;
7. ensuring the fluence level of the secondary focal waists are of sufficient intensity and number to ensure propagation of a photoacoustic compressive machining through the desired volume of the target; and
8. applying at least one burst of laser pulses of a suitable wavelength, suitable burst pulse repetition rate and suitable burst pulse energy from the laser source to the target through the selected distributive-focus lens focusing assembly, wherein the total amount of pulse energy or fluence, applied to the target at a spot where the laser pulse contacts the point of initiation of machining on the target, is greater than the critical energy level required to initiate ablative machining to the desired depth and thereinafter the fluence energy at the bottom of the ablatively drilled orifice is greater than the critical energy level to initiate and propagate a filamentation and photoacoustic compression machining, yet is lower than the threshold critical energy level required to initiate ablative machining; and
9. stopping the burst of laser pulses and filamentation when the desired machining has been completed.

The various parameters of the laser properties, the location of the principal focal waist, and the final focusing lens arrangements as well as the characteristics of the orifice created are set forth in the following table. It is to be noted that they are represented in ranges as their values vary greatly with the type of the target material, its thickness and the size and location of the desired orifice. The following chart details the ranges of the various system variables used to accomplish the drilling of uniform orifices in any of a plethora of transparent materials.

| Laser Properties | |
|---|---|
| Wavelength | 5 microns or less |
| Pulse width | 10 nanoseconds or less |
| Freq (laser pulse repetition rate) | 1 Hz to 2 MegaHz |
| Average power | 200-1 watt |
| Number of sub pulses per burst | 1 to 50 |
| Sub pulse spacing | 1 nanosecond to 10 microsecond |
| Pulse energy | 5 micro Joules (µJ) to 500 micro Joules (µJ) (Average power/repetition rate) watts/1/sec |
| Orifice Properties | |
| Min Orifice Diameter | .5 microns |
| Max Orifice Diameter | 50 microns |
| Max Orifice Depth | 10 mm in borosilicate glass |
| Typical Aspect Ratio | 1500:1 |
| Max Aspect Ratio | 2500:1 |
| Aberrated lens ratio | where the Cx:Cy ratio of the lenses are (−5 to 4,000) |
| Orifice Sidewall Smoothness (Material Independent) | <5 micron ave. roughness (e.g., Si, SiC, SiN, GaAs, GaN, InGaP) |
| Orifice Side Wall Taper (Material Independent) | Negligible across 10,000 micron depth |
| Beam Properties | |
| Focal Distribution | −5 to 4,000 |
| $M^2$ | 1.00-5.00 |

As noted earlier the parameters above vary with the target. In the way of an operational exemplary, to drill a 3 micron hole 2 mm deep in a transparent substrate the following apparatus and parameters would be used: a 1064 nanometer wavelength laser; 65 watts of average power; 80 µJ pulse energy; 8 subpulses per burst at 50 MHz; and a 100 kHz repetition rate. This would be focused with an aberated lens delivering distributed foci over 2 mm of space (filament active zone is 2 mm long) focusing 5 microns to 500 microns above the top surface depending upon the material.

It is to be understood that the invention is not limited in its application to the arrangements of the components set forth in the following description or illustrated in the drawings. The invention is capable of other embodiments and of being practiced and carried out with various different ordered steps. Also, it is to be understood that the phraseology and terminology employed herein are for the purpose of descriptions and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

We claim:

1. A photoacoustic compression method for machining a transparent target material, comprising the steps of:
    applying a laser beam having at least one burst of laser pulses, said laser beam operating at a wavelength less than 5 µm, a laser burst pulse repetition rate between 1 Hz to 2 MHz having a number of subpulses in the range of 1 to 50 per burst of said laser pulses, and, each pulse having burst pulse energy of 5-500 µJ, from a laser beam source to a distributive focus lens focusing assembly which focuses said laser pulses, prior to application of said laser pulses to said surface of said transparent target;
    total pulse energy or fluence applied to said transparent target at a spot where said laser pulses contact a surface of said transparent target, said spot being the point of initiation of machining on said transparent target determined by said wavelength, said laser burst pulse repetition rate, said number of subpulses per burst, and said burst pulse energy; and,
    adjusting said wavelength, adjusting said laser burst pulse repetition rate, adjusting said number of subpulses per burst, and adjusting said energy per pulse to initiate and propagate photoacoustic compression machining, and prevent ablative machining.

2. The photoacoustic compression method for machining a transparent target material, as claimed in claim 1, wherein said focusing comprises:
    delivering said laser pulses to said surface of said transparent target after adjustment of the relative distance or angle of said distributive focus lens focusing assembly in relation to said laser source;
    focusing said laser pulses in said distributive focus lens focusing assembly so as to create a principal focal waist and at least one secondary focal waist; and,
    adjusting said principal focal waist such that said principal focal waist does not reside on or in said transparent target that is being machined.

3. The photoacoustic compression method for machining a transparent target material, as claimed in claim 1, wherein said focusing comprises:
    delivering said laser pulses to said surface of said transparent target after adjustment of the relative distance or angle of said distributive focus lens focusing assembly in relation to said laser source; and,
    focusing said laser pulses in said distributive focus lens focusing assembly so as to create a principal focal waist and at least one secondary focal waist; and,
    adjusting said transparent target distance with respect to said principal focal waist and at least one secondary focal waist.

4. The photoacoustic compression method for machining a transparent target material, as claimed in claim 2, further comprising the steps of:
    adjusting said focus of said laser pulses such that said spot is located below or above said principal focal waist, said spot has a diameter larger than a diameter of a filament formed in said transparent target.

5. The photoacoustic compression method for machining a transparent target material, as claimed in claim 3, further comprising the steps of:
    adjusting said focus of said laser pulses such that said spot is located below or above said principal focal waist, said spot has a diameter larger than a diameter of a filament formed in said transparent target.

6. The photoacoustic compression method for machining a transparent target material, as claimed in claim 2, wherein said transparent target may be comprised of one or a set of transparent wafers, plates or substrates in a layered configuration; and wherein machining of said transparent target is the drilling of stopped or through orifices beginning at any depth and in any one of said set of wafers, plates or substrates in said layered configuration.

7. The photoacoustic compression method for machining a transparent target material, as claimed in claim 3, wherein said transparent target may be comprised of one or a set of transparent wafers, plates or substrates in a layered configuration; and wherein machining of said transparent target is the drilling of stopped or through orifices beginning at any depth and in any one of said set of wafers, plates or substrates in said layered configuration.

8. The photoacoustic compression method for machining a transparent target material, as claimed in claim 1, wherein said transparent target may be comprised of one or a set of transparent wafers, plates or substrates in a layered configuration; and wherein machining of said transparent target is the drilling of stopped or through orifices beginning at any depth and in any one of said set of wafers, plates or substrates in said layered configuration.

9. The photoacoustic compression method for machining a transparent target material, as claimed in claim 2, wherein said distributive focus lens focusing assembly determines said fluence level of said secondary focal waists, said secondary focal waists are of sufficient intensity and number to ensure propagation of said photoacoustic compressive machining through a desired volume of said transparent target.

10. The photoacoustic compression method for machining a transparent target material, as claimed in claim 3, wherein said distributive focus lens focusing assembly determines said fluence level of said secondary focal waists, said secondary focal waists are of sufficient intensity and number to ensure propagation of said photoacoustic compressive machining through a desired volume of said transparent target.

11. The photoacoustic compression method for machining a transparent target material, as claimed in claim 1, wherein said laser pulses have a burst frequency in the range of 100 kHz to 90 MHz to maintain photoacoustic compression within said transparent target, said laser pulses having a pulse width of less than 10 nanoseconds.

12. The photoacoustic compression method for machining a transparent target material, as claimed in claim 1, including applying a sacrificial layer to a surface of said material prior to the said application of said burst of laser pulses.

13. The photoacoustic compression method for machining a transparent target material, as claimed in claim 1, wherein no material from said transparent target material is removed from said transparent target by said photoacoustic compression.

14. The photoacoustic compression method for machining a transparent target material, as claimed in claim 1, wherein said distributive focus lens focusing assembly is selected from the group consisting of: aspheric plates, telecentric lenses, non-telecentric lenses, aspheric lenses, axicon, annularly faceted lenses, custom ground aberrated non-perfect lenses, a combination of positive and negative lenses or a series of corrective plates, and, an optical element tilted with respect to the incident beam.

15. A photoacoustic compression method for machining a transparent target material, comprising the steps of:
applying a laser having at least one burst of laser pulses, said laser operating at a wavelength less than 5 μm, a laser burst pulse repetition rate between 1 Hz to 2 MHz having a number of subpulses in the range of 1 to 50 per burst of said laser pulses, said laser subpulses have a burst frequency in the range of 100 kHz to 90 MHz, said laser pulses having a pulse width of less than 10 nanoseconds, and, having burst pulse energy of 5-500 μJ, from a laser source through a distributive lens focusing assembly and to said transparent target;
delivering said laser pulses to said transparent target after adjustment of the relative distance or angle of said distributive focus lens focusing assembly in relation to said laser source so as to focus said laser pulses in a distributed focus configuration creating a principal focal waist and at least one secondary focal waist;
photoacoustic compression machining is produced by said laser pulse energy delivered to said transparent target which initiates a Kerr Effect self focusing which is propagated in said transparent target by additional energy input to said transparent target by said secondary focal waists thus producing a filament within said transparent target; and,
total energy input to said transparent target is below the level required to initiate ablative or vaporization based machining of said transparent target.

16. The photoacoustic compression method for machining a transparent target material, as claimed in claim 15, wherein no material from said transparent target material is removed from said transparent target by said photoacoustic compression.

17. The photoacoustic compression method for machining a transparent target material, as claimed in claim 15, wherein said distributive focus lens focusing assembly is selected from the group consisting of: aspheric plates, telecentric lenses, non-telecentric lenses, aspheric lenses, axicon, annularly faceted lenses, custom ground aberrated non-perfect lenses, a combination of positive and negative lenses or a series of corrective plates, and, an optical element tilted with respect to the incident beam.

18. A photoacoustic compression method for machining a transparent target material, comprising the steps of:
applying a laser having at least one burst of laser pulses, said burst of laser pulse having a number of subpulses in the range of 1 to 50 per burst of said laser pulses, from a laser source through a distributive lens focusing assembly and to said transparent target;
adjusting said distributive focusing assembly position in relation to said laser source and said transparent target;
creating a principal focal waist and at least one secondary focal waist;
photoacoustic compression machining is produced by said laser pulse energy delivered to said transparent target which initiates a Kerr Effect self focusing which is propagated in said transparent target by additional energy input to said transparent target by said secondary focal waists thus producing a filament within said transparent target.

19. The photoacoustic compression method for machining a transparent target material, as claimed in claim 18, wherein no material from said transparent target material is removed from said transparent target by said photoacoustic compression.

20. The photoacoustic compression method for machining a transparent target material, as claimed in claim 18, wherein said distributive focus lens focusing assembly is selected from the group consisting of: aspheric plates, telecentric lenses, non-telecentric lenses, aspheric lenses, axicon, annularly faceted lenses, custom ground aberrated non-perfect lenses, a combination of positive and negative lenses or a series of corrective plates, and, an optical element tilted with respect to the incident beam.

21. The photoacoustic compression method for machining a transparent target material, as claimed in claim 18, further comprising the steps of:
creating a plurality of secondary focal waists within said transparent target.

22. The photoacoustic compression method for machining a transparent target material, as claimed in claim 2, further comprising the steps of:
creating a plurality of secondary focal waists within said transparent target.

23. The photoacoustic compression method for machining a transparent target material, as claimed in claim 1, further comprising the steps of:
creating a principal focal waist above or below said transparent target; and,
creating a plurality of secondary focal waists within said transparent target.

24. The photoacoustic compression method for machining a transparent target material, as claimed in claim 1, wherein said transparent target material is selected from the group consisting of glass, oxide glasses, borosilicate glass, chemically or heat strengthened glass, glass ceramics, Sapphire, glass layered on Sapphire, glass coated with metals, glass coated with polymers, SiC, GaN, and Si wafers.

* * * * *